US009843626B2

(12) United States Patent
Trinh et al.

(10) Patent No.: US 9,843,626 B2
(45) Date of Patent: Dec. 12, 2017

(54) METHOD, SYSTEM AND APPARATUS FOR CONTROLLING AN APPLICATION

(71) Applicants: Trung (Tim) Trinh, Nepean (CA); Thomas A. Gray, Mansfield (CA)

(72) Inventors: Trung (Tim) Trinh, Nepean (CA); Thomas A. Gray, Mansfield (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 374 days.

(21) Appl. No.: 14/458,226

(22) Filed: Aug. 12, 2014

(65) Prior Publication Data

US 2016/0050260 A1 Feb. 18, 2016
US 2017/0302727 A9 Oct. 19, 2017

Related U.S. Application Data

(60) Division of application No. 12/217,074, filed on Jun. 30, 2008, now abandoned, which is a continuation-in-part of application No. 12/079,519, filed on Mar. 27, 2008, now abandoned.

(51) Int. Cl.
*G06F 15/16* (2006.01)
*H04L 29/08* (2006.01)
*H04L 12/58* (2006.01)
*H04L 12/18* (2006.01)

(52) U.S. Cl.
CPC .......... *H04L 67/10* (2013.01); *H04L 12/1822* (2013.01); *H04L 51/22* (2013.01)

(58) Field of Classification Search
None
See application file for complete search history.

(56) References Cited

U.S. PATENT DOCUMENTS

| | | | |
|---|---|---|---|
| 5,590,188 | A | 12/1996 | Crockett |
| 5,758,079 | A | 5/1998 | Ludwig et al. |
| 5,857,966 | A | 1/1999 | Clawson |
| 6,301,609 | B1 | 10/2001 | Aravamundan et al. |
| 6,311,182 | B1 | 10/2001 | Colbath et al. |
| 6,421,439 | B1 | 7/2002 | Liffick |

(Continued)

FOREIGN PATENT DOCUMENTS

| | | | |
|---|---|---|---|
| EP | 0510411 | B1 | 3/1992 |
| EP | 0825752 | A2 | 2/1998 |

(Continued)

OTHER PUBLICATIONS

Gray, Tom et al., Context and Intent in Call Processing; Features Interactions in Telecommunications and Software Systems VII; 2003; pp. 177-184; Amsterdam: IOS Press.

(Continued)

*Primary Examiner* — Richard G Keehn

(57) ABSTRACT

A method, system and apparatus of controlling at least one application on an electronic device. Interfacing occurs between a context object and the at least one application. Context data is retrieved from the context object. At least one of the following further occurs: the context object is updated with new context data derived from interactions with the at least one application; the behavior of the at least one application is modulated based on the context data; and at least one data field in the application is populated with the context data.

20 Claims, 21 Drawing Sheets

(56) References Cited

U.S. PATENT DOCUMENTS

| | | | | |
|---|---|---|---|---|
| 6,700,967 | B2 | 3/2004 | Kleinoder et al. | |
| 6,760,426 | B2 | 7/2004 | Sbisa et al. | |
| 7,089,280 | B1 | 8/2006 | Satapathy et al. | |
| 7,110,514 | B2 | 9/2006 | Brown et al. | |
| 7,174,361 | B1 | 2/2007 | Paas | |
| 7,219,302 | B1 | 5/2007 | O'Shaughnessy et al. | |
| 7,292,685 | B2 | 11/2007 | Gray | |
| 7,343,312 | B2 | 3/2008 | Capek et al. | |
| 7,415,104 | B2 | 8/2008 | Gray et al. | |
| 7,679,518 | B1 | 3/2010 | Pabla et al. | |
| 2004/0037396 | A1 | 2/2004 | Gray | |
| 2005/0083911 | A1 | 4/2005 | Grabelsky et al. | |
| 2005/0100157 | A1 | 5/2005 | Gray | |
| 2005/0246682 | A1 | 11/2005 | Hines | |
| 2006/0074726 | A1 | 4/2006 | Forbes et al. | |
| 2006/0173936 | A1* | 8/2006 | Castro | G06Q 10/10 |
| 2007/0147596 | A1 | 6/2007 | Moser | |
| 2008/0117839 | A1 | 5/2008 | Raju et al. | |
| 2008/0189366 | A1 | 8/2008 | Cox et al. | |
| 2008/0243545 | A1 | 10/2008 | D'Ambrosia et al. | |
| 2009/0013044 | A1* | 1/2009 | Stull | G06Q 10/10 709/205 |
| 2009/0083652 | A1* | 3/2009 | Krasner | G06F 17/30557 715/772 |
| 2009/0171938 | A1* | 7/2009 | Levin | G06F 17/30864 |
| 2009/0248476 | A1* | 10/2009 | Trinh | G06Q 10/107 705/7.19 |
| 2009/0287626 | A1* | 11/2009 | Paek | G06F 17/3064 706/46 |
| 2009/0307170 | A1* | 12/2009 | Jordan | G06N 5/04 706/47 |
| 2010/0174560 | A1* | 7/2010 | Quan | G06Q 10/06311 705/3 |

FOREIGN PATENT DOCUMENTS

| | | | |
|---|---|---|---|
| GB | 2351870 | A | 10/2001 |
| GB | 2369529 | A | 5/2002 |
| WO | WO 99/26424 | A2 | 5/1999 |
| WO | WO 02/071706 | A1 | 9/2002 |

OTHER PUBLICATIONS

Bergman, Ruth et al., A Personal Email Assistant; Software Technology Laboratory; HPL-2002-236; Aug. 22, 2002.
Dey, Anind K. et al. CybreMinder: A Context-Aware System for Supporting Reminders; Future computing Environments Group; Georgia Institute of Technology.
The Intraspect Knowledge Management Solution: Technical Overview; 1998 Instraspect Software v1.20; pp. 1-18.
IMS v4 for Microsoft Outlook; Available at http://www.clearcontext.com/products/pro.html (1 of 4).
Dey, Anind K. et al., CyberDesk: A Framework for Providing Self-Integrating Context-Aware Services; Available at: http://www.cc.gatech.edu/fce/cyberdesk/pubs/IUI98.html (1-20).
Aery, Manu et al., eMailSift: Adapting Graph Mining Techniques for Email Classification; Technical Report CSE-2004-7; Jul. 2004.
Golbeck, Jennifer et al., Reputation Network Analysis for Email Filtering; University of Maryland, College Park; MINDSWAP.
Greenberg, Saul et al., GroupWeb: A WWW Browser as Real Time Groupware; Department of Computer Science, University of Calgary Technical Report.
Morris, Meredith R., Interfaces for Collaborative Exploraory Web Serach: Motivations and Directions for Multi-User Designs; Position Paper; pp. 1-4.
Schulzrinne, H., "Requirement for Emergency Context Resolution with Internet Technologies" RFC: 5012; Jan. 2008 pp. 1-23.
Cisco White Paper "Beyond Radio: Redefining Interoperability to Enhance Public Safety" C11-364833-01: Mar. 2007; pp. 1-9.
Cisco Data Sheet "Cisco IPICS Server" pp. 1-6; C78-60031-05: Jan. 2008.
Cisco Quick Start: "Using Cisco IPICS on Your IP Phone" Cisco IPICS Server Administration Guide, Release 2.1(1).
Diniz, Viviane, "Knowledge Management Support for Collaborative Emergency Response" (9th International Conference on Computer Supported Cooperative Work in Design pp. 1188-1193.
Morris, Meredith R. et al, Search Together: An Interface for Collaborative Web Search; Position Paper; pp. 1-10.

* cited by examiner

| To | From | Date | Subject |
|---|---|---|---|
| Gail Platt | Ken Barlow | 3/22/06 | Staffing Levels |
| Mavis Riley | Ken Barlow | 3/22/06 | re: Staffing Levels |
| Gail Platt | Mavis Riley | 12/15/06 | re: Staffing Levels |
| Rita Fairclough | Annie Walker | 2/28/08 | Customer Preview |
| Stan Ogden | Rita Fairclough | 2/28/08 | B3499 Functionality |
| Stan Ogden | Mike Baldwin | 3/1/08 | re: B3499 Functionali |
| Ken Barlow | Eddie Yates | 3/2/08 | re: Staffing Levels |
| Mike Baldwin | Stan Ogden | 3/2/08 | re: B3499 Functionali |
| Rita Fairclough | Jack Duckworth | 3/3/08 | 3499 -- Large Orders |
| Gail Platt | Rita Fairclough | 3/4/08 | re:3499 --Large Orders |
| Rita Fairclough | Gail Platt | 3/4/08 | Ahead of Schedule! |

Gail

Jack is expecting good things from the B3499. Ken is pleased as well. Please check with Stan and Mike that the new active displays are functional. Annie would like to show these to the lead customers ASAP.

Rita

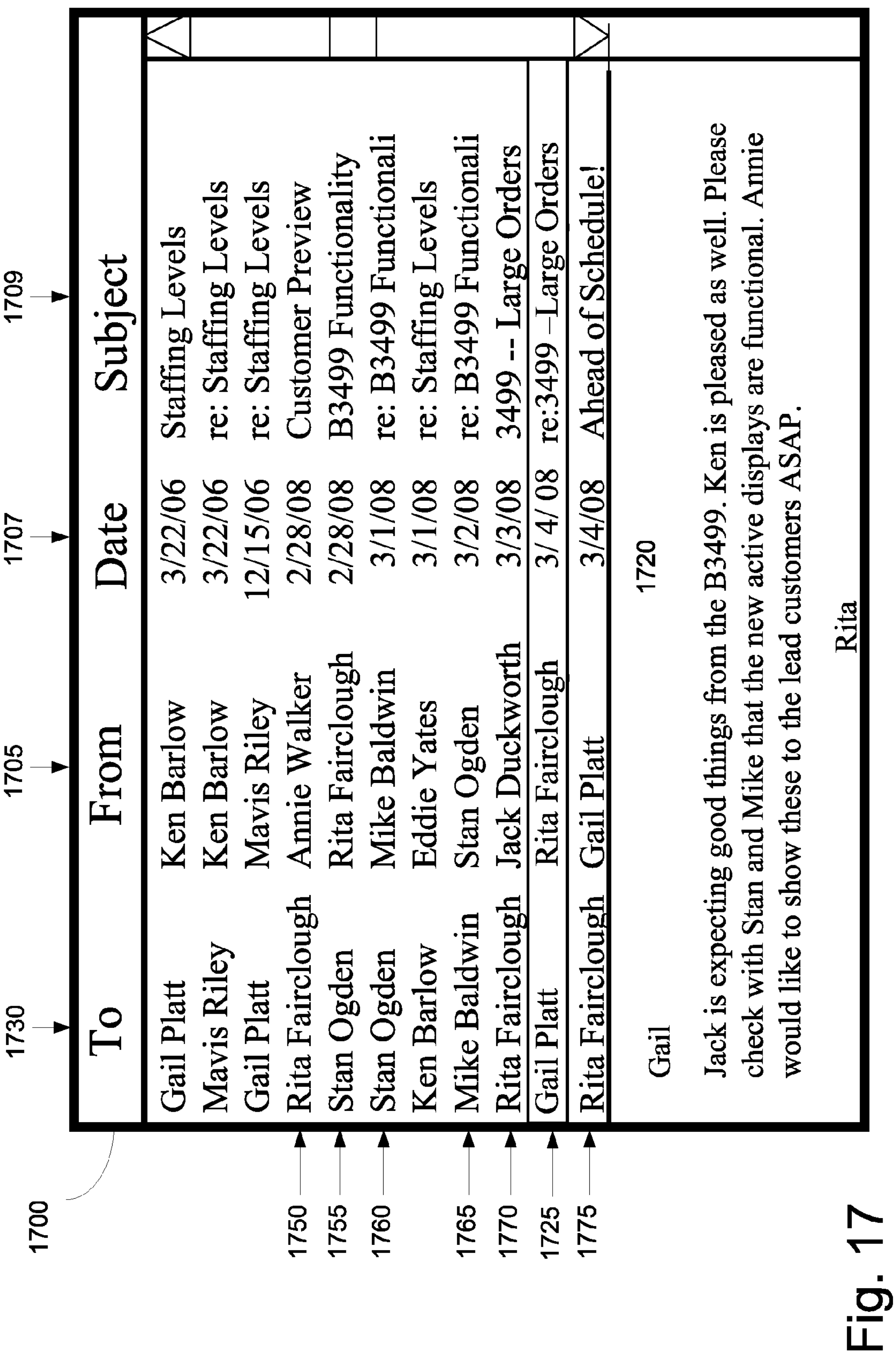

Fig. 17

| To | From | Date | Subject |
|---|---|---|---|
| Gail Platt | Ken Barlow | 3/22/06 | Staffing Levels |
| Mavis Riley | Ken Barlow | 3/22/06 | re: Staffing Levels |
| Gail Platt | Mavis Riley | 12/15/06 | re: Staffing Levels |
| Rita Fairclough | Annie Walker | 2/28/08 | Customer Preview |
| Stan Ogden | Rita Fairclough | 2/28/08 | B3499 Functionality |
| Stan Ogden | Mike Baldwin | 3/1/08 | re: B3499 Functionali |
| Ken Barlow | Eddie Yates | 3/1/08 | re: Staffing Levels |
| Mike Baldwin | Stan Ogden | 3/2/08 | re: B3499 Functionali |
| Rita Fairclough | Jack Duckworth | 3/3/08 | 3499 -- Large Orders |
| Gail Platt | Rita Fairclough | 3/4/08 | re:3499 -- Large Orders |
| Rita Fairclough | Gail Platt | 3/4/08 | Ahead of Schedule! |

...the B3499. Ken is pleased as well. Please
...new active displays are functional. Annie
would like to show these to the lead customers ASAP.

Rita

Gail Platt, Mavis Riley, Rita
Fairclough, Jack Duckworth

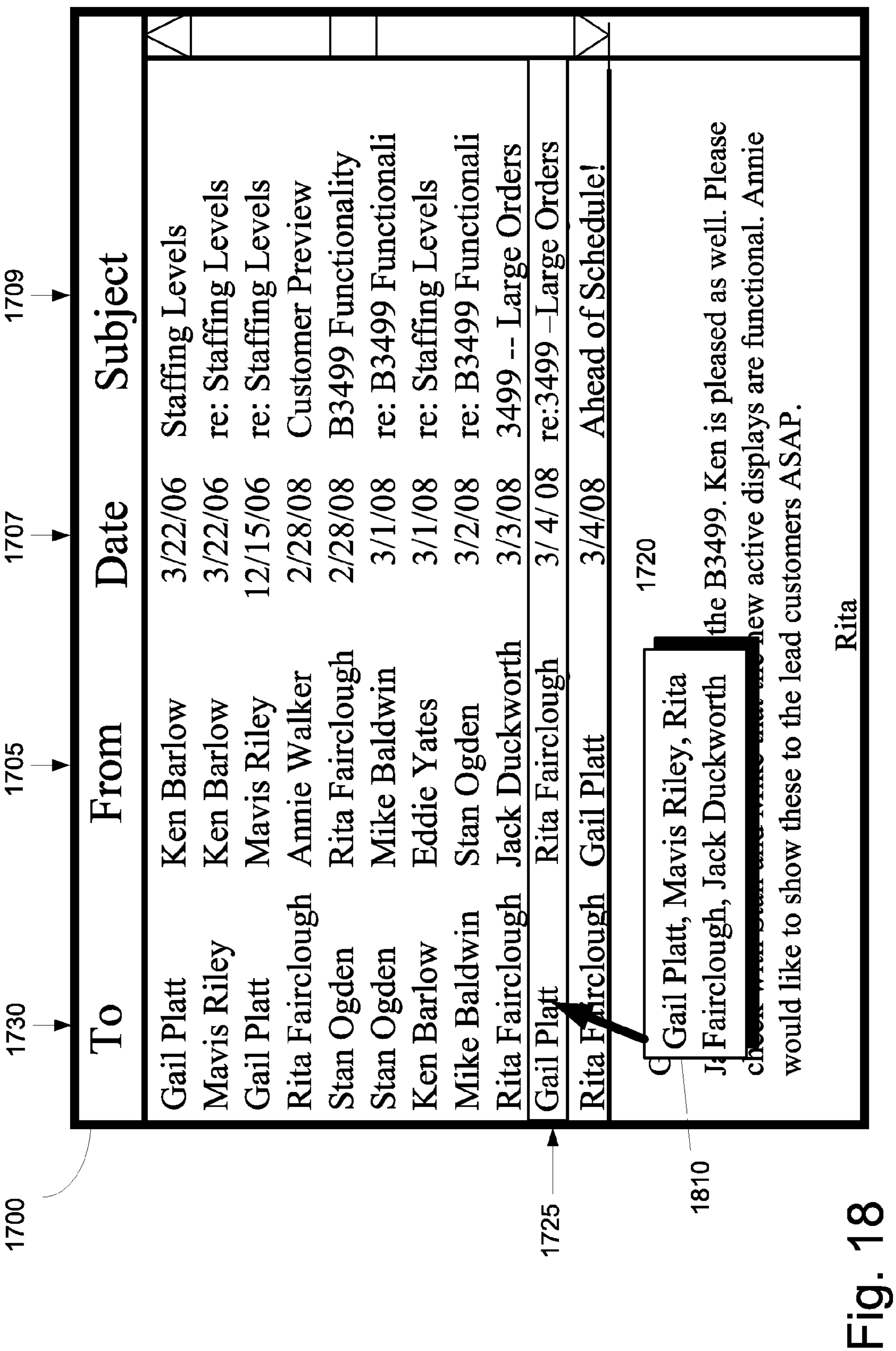

Fig. 18

METHOD, SYSTEM AND APPARATUS FOR CONTROLLING AN APPLICATION

CROSS REFERENCE TO RELATED APPLICATIONS

This application is a divisional of application Ser. No. 12/217,074, filed Jun. 30, 2008, which is a continuation-in-part of application Ser. No. 12/079,519, filed Mar. 27, 2008, and incorporated herein by reference.

FIELD

The specification relates generally to communication systems, and specifically to a method, system and apparatus for controlling an application at an electronic device.

BACKGROUND

The work of an enterprise (e.g. a business and/or organization) may be divided into formal and informal parts. The formal work is prescribed by business processes. The informal work is to manage these processes. However, personnel (e.g. managers) often find it challenging to manage information about the multitude of issues addressed on a daily basis, and further may find collaborating with colleagues in these matters challenging.

For example, personnel often need to partition their attention across many issues of varying urgency in an organization, and they must often function outside of normal formal business processes and workflows, addressing and resolving issues as they arise, often on piecewise basis. It becomes very challenging to track the various issues being managed. In a specific example, in a single conversation, two members of an organization may discuss/manage several different issues that may or may not be interrelated. Further, the consideration of a strategic issue may have to be deferred to deal with an urgent issue that is (e.g.) stopping production or alienating a customer. In these situations, personnel will not typically have the luxury of planning a schedule so as to be able to carefully prepare for each task. Rather they must be able to dynamically assess a situation and render attention to the most currently important issues, setting priorities among competing requests for higher attention to deal with the most pressing matters. In doing so, personnel will often be shifting attention from one matter to another, and hence members of an organization must be able to become quickly familiar with the new issue. Further, they must be able to refresh their memory about a matter that has been put aside and to become aware of developments that have occurred since it was last taken up.

While Customer Relationship Management (CRM) systems do address some of these problems however, they are largely directed to maintaining a relationship with a customer: when a customer calls, an agent is provided with a screen pop yields tombstone (name, address, etc.) data along with a history of the customer's prior interactions with the organization, such as prior purchases or interactions to resolve issues. The agent is further provided with a script based on these prior interactions. While this information assists the agent with handling the call, the agent is generally not being asked to judgement calls in relation to the business context of the customer: in other words, the CRM is assisting largely with formal processes, but not informal processes. Neither does the CRM assist the agent with managing issues within the organization.

Furthermore, personnel may be interacting with various applications in the course of a workday, and may be regularly configuring each application for particular contexts. Using the example of scheduling the next meeting in a context in a scheduling application, for example when a user is currently participating in a meeting associated with a the same context, the user will have to take time to enter the names of all participants in the next meeting, the reason for the next meeting and other information so that the scheduling application can perform its task. This is irritating as all the required data within the context is generally available, but the application must be manually configured with the data. While some applications may allow for customization according to certain context-based data, for example distribution lists in e-mail applications, each individual application must generally be individually customized.

SUMMARY

A first aspect of the specification provides a method for controlling at least one application on an electronic device. The method comprises interfacing between a context object and the at least one application. The method further comprises retrieving context data from the context object. The method further comprises at least one of: updating the context object with new context data derived from interactions with the at least one application; modulating behaviour of the at least one application based on the context data; and populating at least one data field in the application with the context data.

Modulating the behaviour of the at least one application based on the context data can comprise at least one of enabling a first set of features in the at least one application and disabling a second set of features in the at least one application.

The context object can comprise an active context object.

The method can further comprise determining an active context and retrieving the context data from the context object can be based on the active context.

The context object can be shared between collaborating parties associated with the context.

The at least one application can comprise an e-mail application. The context data can comprise e-mail data associated with a context, and modulating the behaviour can comprise displaying all the e-mail data. The e-mail data can comprise all e-mail concerning the context exchanged by collaborating parties associated with the context. The e-mail data can comprise a hash of text of each e-mail concerning the context, in a one-to-one relationship, the method further comprising removing duplicate e-mail based on the hash.

The at least one application can comprise a scheduling application. The context data can comprise scheduling data of collaborating parties associated with a context, and modulating the behaviour can comprise processing the schedule data. Modulating the behaviour can further comprise offering options in a user interface based on the context. The method can further comprise determining a subset of collaborating parties that are participating in a conference via at least one communication device, and wherein processing the schedule data comprises processing schedule data associated with the subset.

The context data can comprise identifiers of users associated with a context and populating the at least one data field can comprise populating the at least one data field with the identifiers.

The at least one application can comprise a browser application. The context data can comprise keywords, the keywords comprising at least one of common keywords and apposite keywords and modulating the behaviour can comprise searching on at least one of the keywords. Populating the at least one data field can comprise populating the at least one data field in a plurality of browser applications, each associated with collaborating parties associated with a context, in a one-to-one relationship. The interactions with the at least one application can comprise automatic speech recognition for identifying the keywords and wherein the searching on at least one of the keywords is initiated in response to automatic speech recognition identifying the at least one of the keywords.

Interfacing between a context object and the at least one application can occur via a harness application at a second electronic device, the harness application in communication with the context object and the at least one application via a communication network.

A second aspect of the specification provides an electronic device for controlling at least one application. The electronic device comprises a communication interface for interfacing between a context object and the at least one application. The electronic device further comprises a processing unit enabled for: retrieving context data from the context object. The processing unit is further enabled for at least one of: updating the context object with new context data derived from interactions with the at least one application; modulating behaviour of the at least one application based on the context data; and populating at least one data field in the application with the context data.

A third aspect of the specification provides a method for controlling at least one application on an electronic device. The method comprises interfacing between an active context object and the at least one application via a harness application, the active context object associated with an active context. The method further comprises retrieving context data from the active context object. The method further comprises at least one of: updating the active context object with new context data derived from interactions with the at least one application, the interactions associated with the active context; enabling a first set of features in the at least one application; disabling a second set of features in the at least one application; and populating at least one data field in the application with the context data.

BRIEF DESCRIPTIONS OF THE DRAWINGS

Embodiments are described with reference to the following figures, in which.

Figure 16:
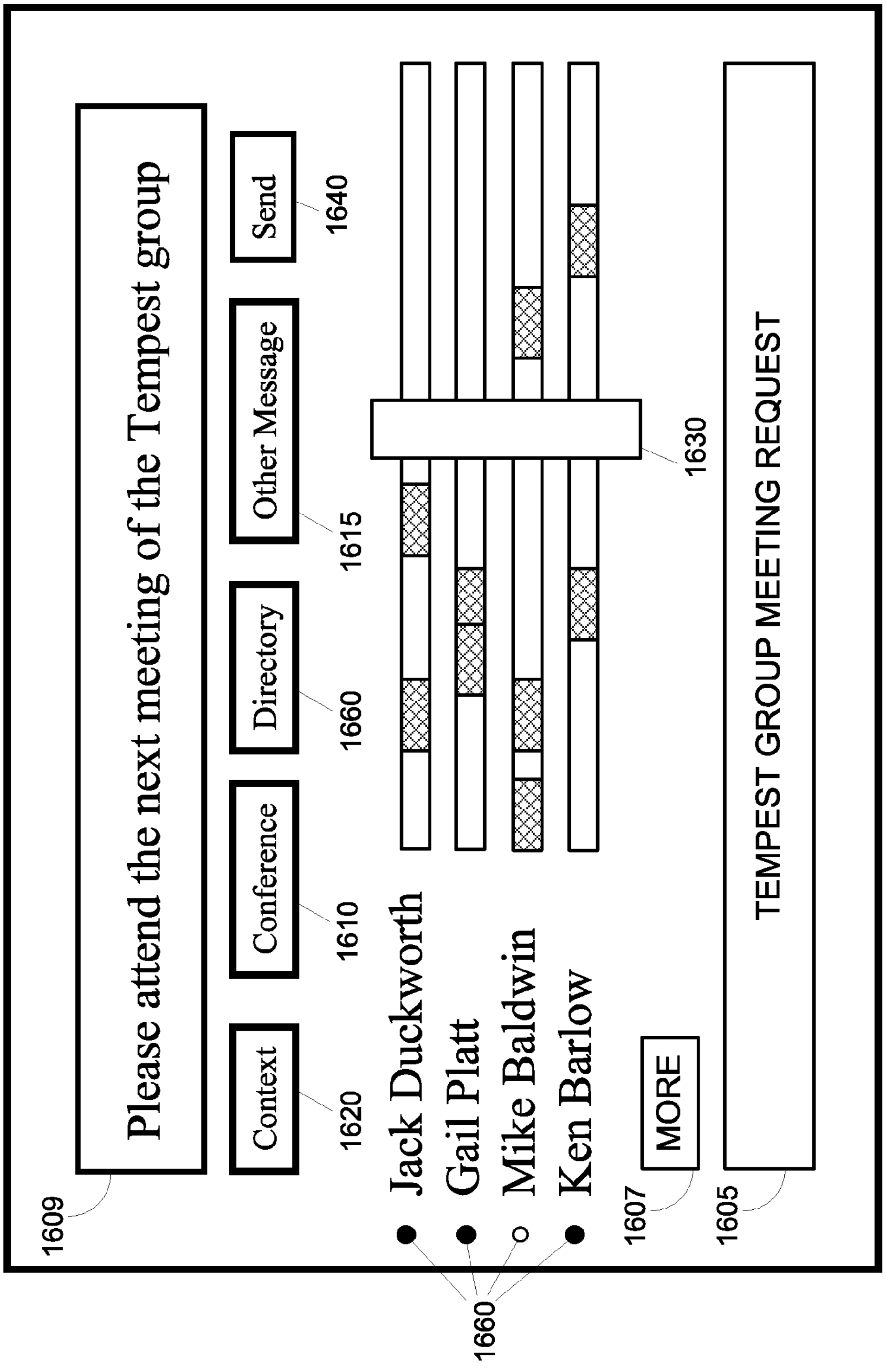
Figure 19:
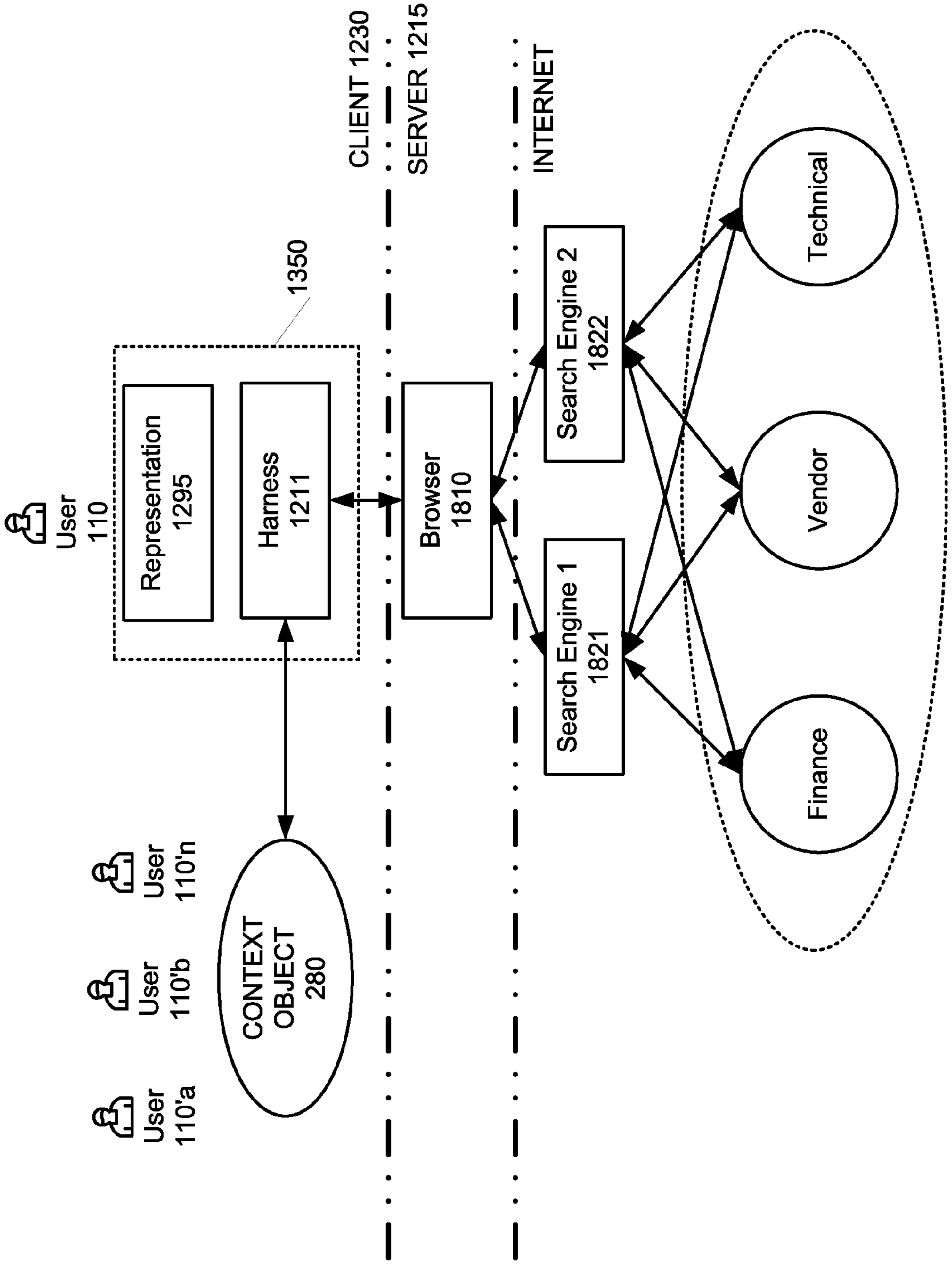
Figure 20:
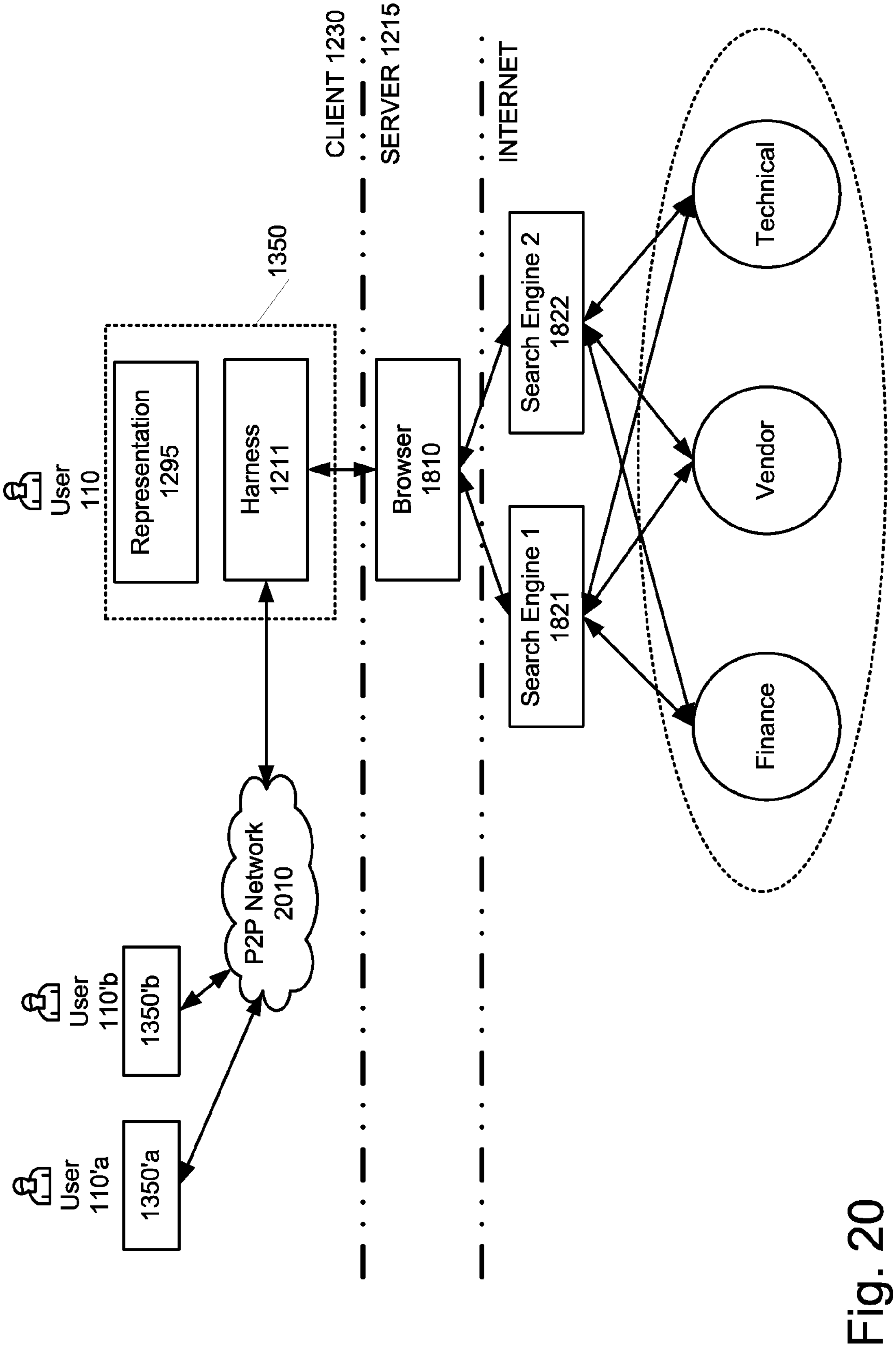
Figure 21:
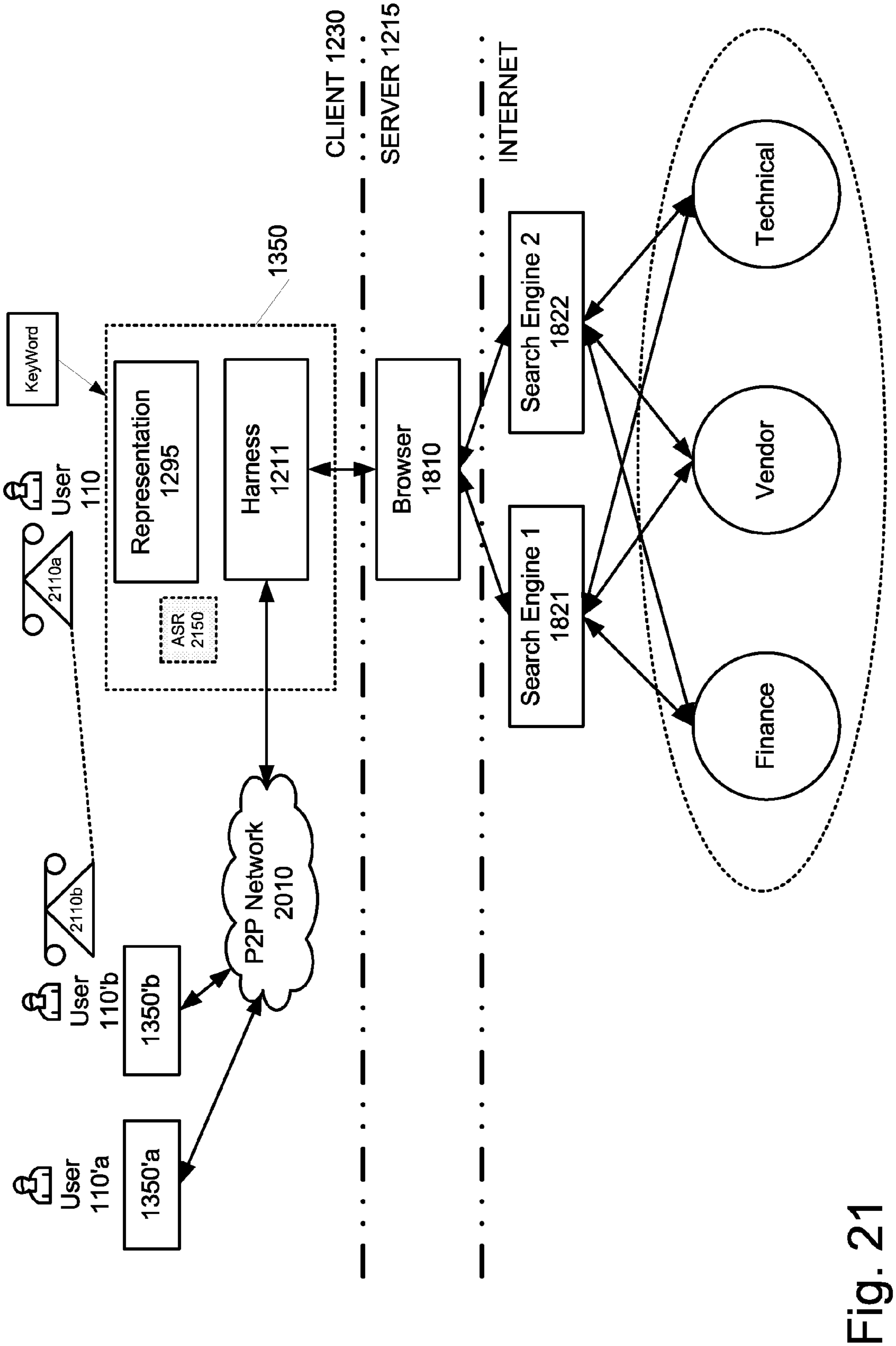

FIGS. 16 though 18 depicts depict views of a GUI of an e-mail application, according to non-limiting embodiments; and FIG. 19 through 21 depict the software architecture of systems for controlling a browser application at an electronic device, according to non-limiting embodiments.

DETAILED DESCRIPTION OF THE EMBODIMENTS

Figure 1:
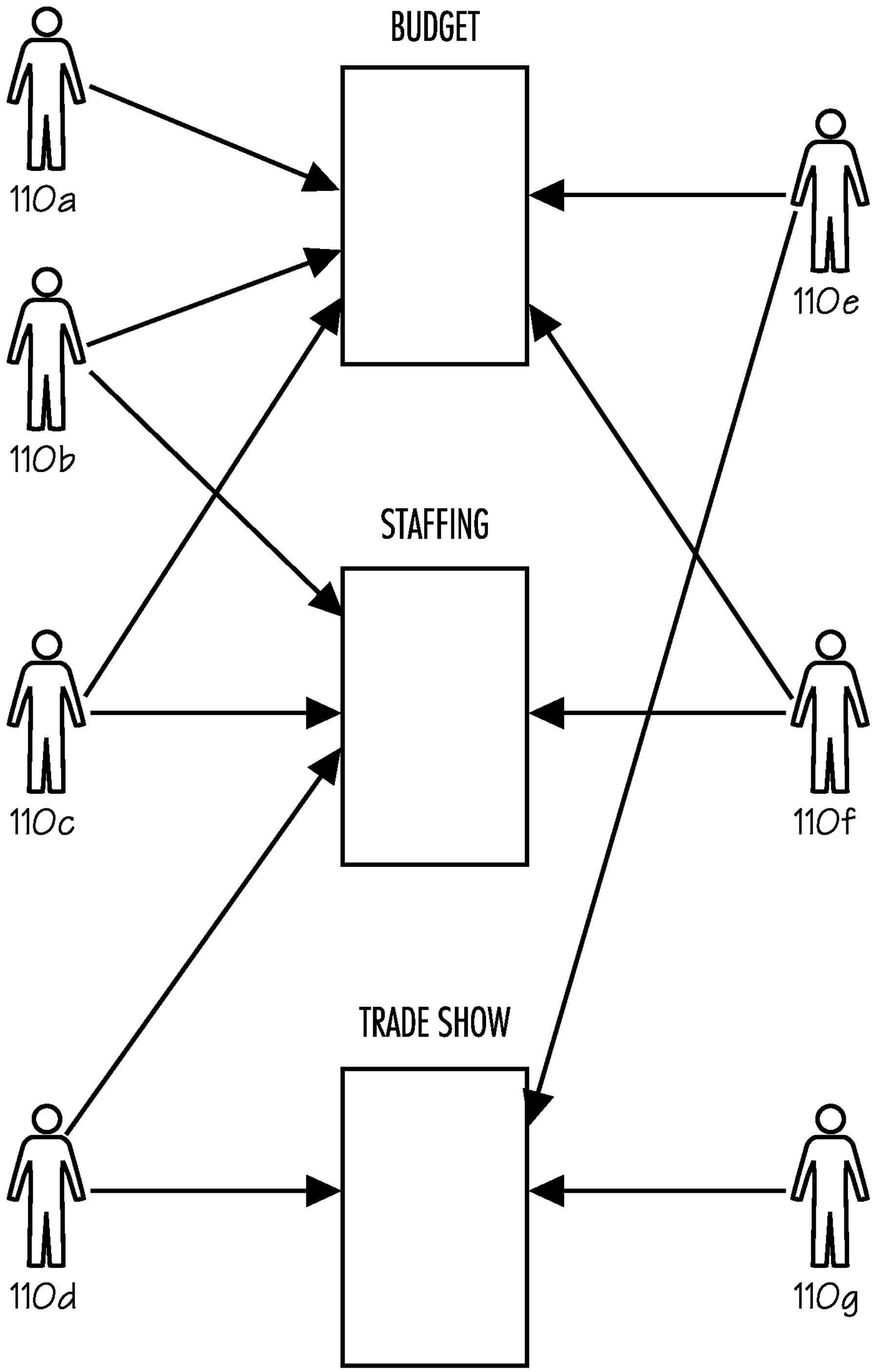
FIG. 1 depicts a schematic diagram of interactions of users within an organization, according to a non-limiting embodiment.

FIG. 1 depicts a schematic diagram of interactions of users 110*a*, 110*b*, 110*c*, etc. (generically a user 110 and collectively users 110) in an organization during a possible workday, the users 110 being employees and/or managers of an organization or business, to illustrate that the users 110 do not work in isolation on individual topics or contexts. Rather they generally work in informal groups that address separate topics or contexts. Hence, each user 110 will spend each day working within different contexts within the organization, a context comprising the data associated with the purpose, behaviour, capability, and history of such groups. A user 110 may be working within several contexts simultaneously and/or consecutively. For example, the user 110*b* is working within the contexts of both "budget" and "staffing", collaborating with the users 110*a*, 110*c*, 119*e* and 110*f* on "budget", and collaborating with the users 110*c*, 110*d* and 110*f* on "staffing". During a communication with the user 110*c*, such as a telephone call or a chat session, the context may start with "budget", shift to "staffing", and back to "budget". During such a communication, various documents may be produced, e-mails generated and sent etc., each associated with a different (or sometimes overlapping) context. Further, during a given workday, some of these contexts will be at the back of the mind of a user 110 mind, and may not be given any degree of attention. Other contexts will be given more attention and one or more contexts will generally be a current context that will have the full attention of the user 110.

Figure 2:
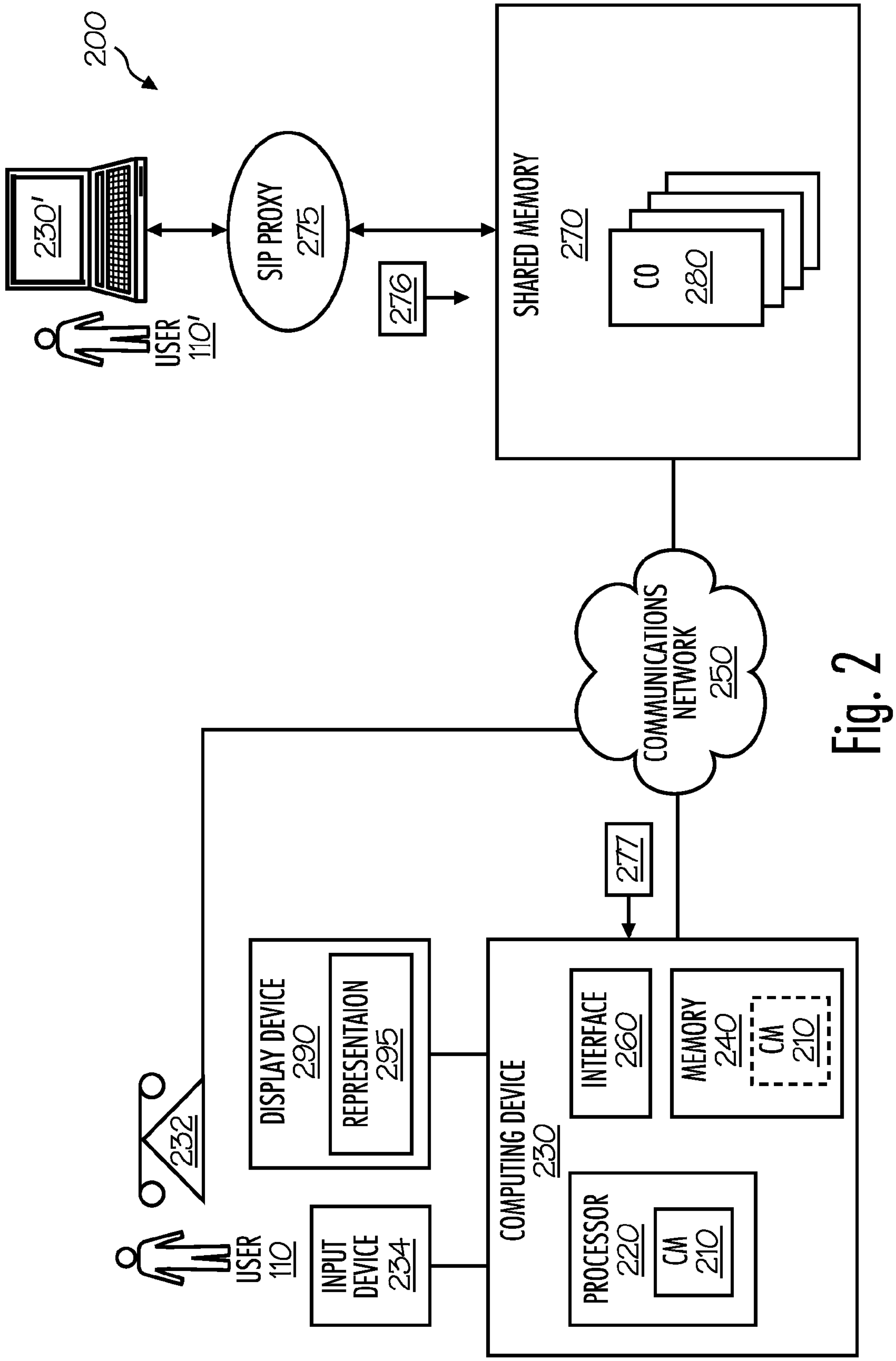
FIG. 2 depicts a system for managing context, according to a non-limiting embodiment.
Figure 3:
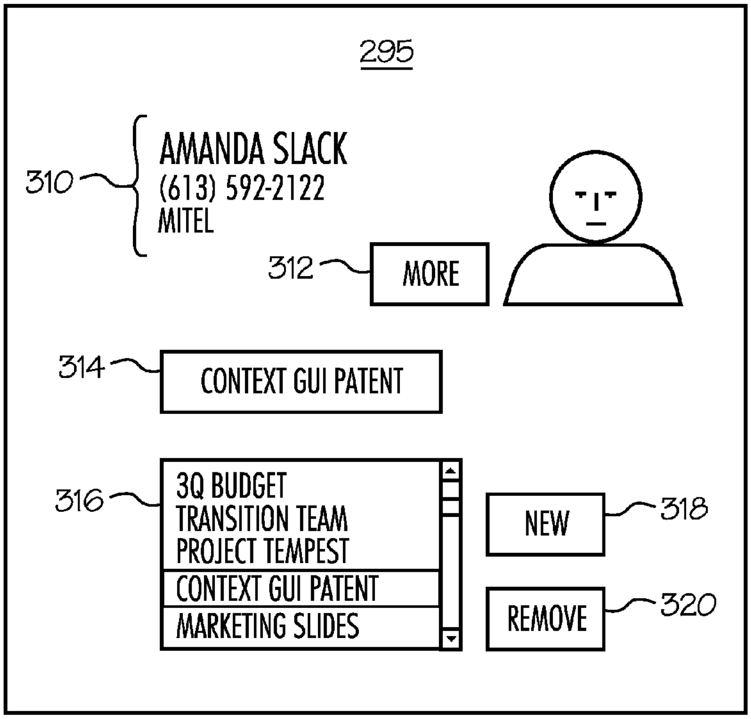
FIG. 3 depicts a system user interface for managing context, according to a non-limiting embodiment.

FIG. 2 depicts a block diagram of a system 200 for managing context, comprising a Context Manager (CM) 210 associated with a user 110, the CM 210 comprising an application processed by a processor 220 of a computing device 230. In some embodiments, the computing device further comprises a memory 240 for storing the CM 210. The computing device 230 is enabled to communicate via a communications network 250 via a communications interface 260. The CM 210 is hence in communication with a shared memory 270. In some embodiments, the shared memory 270 comprises a database, while in other embodiments, the shared memory comprises a tuple space, described below. In general the shared memory 270 is enabled for storing context objects (CO) 280 (generically a CO 280 and collectively COs 280), each CO 280 associated with a different context. While COs 280 are described further below, in general each CO 280 comprises an identifier of the context with which it is associated, and data associated with the context, including but not limited to user(s) 110 associated with the context. The computing device 230 is further coupled to a display device 290, such as a flat panel display (e.g. an LCD) or a CRT, and the computing device 230 is enabled to control the display device 290 to display a representation 295 of a portion of the CM 210. In some embodiments, the representation 295 comprises a graphical user interface (GUI) to the CM 210, as depicted in FIG. 3 and described below. In some embodiments, the computing device 230 may be local to the user 110, for example a personal computer, work station, laptop computer and/or a mobile electronics device (a PDA, cell-phone, and/or a combination). In other embodiments, the computing device 230 may be remote from the user 110, for example as in a client/server computing architecture.

The system 200 also generally comprises an input device 234 coupled to the computing device 230 for receiving input data from the user 110. The input device 234 may comprise a keyboard, a pointing device, a touchscreen, or a combination.

The communications network 250 comprises any desired combination of wired or wireless computing networks, in including a LAN, a WAN, the Internet, the PSTN, a WiFi Network, a WiMax network, a cell network (e.g. CDMA, GMS, 1×), and the like. The interface 260 is generally enabled to receive and transmit communications via the communications network 260.

The CM 210 is generally enabled to supply the current context on which the user 110 is focussed, via the representation 295. Hence, the CM 210 assists the user 110 at becoming more productive and efficient. Further, the CM 210 assists the user 110 with associating various aspects of a workday with contexts. Each of the user's current contexts (which changes through-out a work day, as in FIG. 1) is associated with a CO 280 stored at the shared memory 270, one for each context. Thus CM 210 is also generally enabled to process, create, delete and update COs 280 via communications with the shared memory 270, as described below.

In some embodiments, the system 200 further comprises a SIP proxy 275 (e.g. a computing device for handling SIP communications), the shared memory 270 in communication with the SIP Proxy 275. The SIP proxy 275 is enabled to issue an invitation 276 for collaboration to the user 110 (e.g. via the computing device 230 or an optional communications device 232 associated with the user 110, such as a SIP enabled telephone,) the invitation 276 generally comprising a SIP Invite for a VOIP Call, an IM session etc., as known to one of skill in the art. The invitation 276 will generally be issued when a request for communication (which, in some embodiments, also comprises a SIP invite) arrives at the SIP proxy 275 from another user (e.g. a communication device 230' associated with another user 110', the communication device 230' generally similar to the communication device 230).

In some embodiments, as depicted, the invitation 276 is issued via the shared memory 270, which in turn issues a new call message 277 to the CM 210. While the SIP proxy 275 is depicted in FIG. 2 as being in direct communication with the shared memory 270, it is understood that the SIP proxy 275 may be in communication with the shared memory 270 via the communications network 250 (or another communications network) and that the SIP proxy 275 is in further communication with the computing device 230 and/or the communications device 232. Hence, in these embodiments, the shared memory 270 is enabled as a message router. However, in other embodiments, a new call message 277 may be transmitted via a hard-wired connection. In yet other embodiments, a new call message 277 may be transmitted via any suitable event system or publish/subscribe system. For example, a new call message 277 may be transmitted in a manner similar to packet forwarding inside of a router as known to a person of skill in the art: packets are forwarded based on the contents of their address field. The shared memory 270 (such as a tuple space, or other types of shared memories) may be generally enabled in a similar manner. In other embodiments, the shared memory 270 may be enabled to forward data based on the contents of other fields.

In any event, FIG. 2 further depicts a non-limiting example of a situation in which context may be managed via the CM 210. When the message 277 is received by the CM 210, the computing device 230 controls the display device 290 to display the representation 295, if not already displayed, for viewing by the user 110. A non-limiting embodiment of the representation 295 is depicted in FIG. 3. In this embodiment, the representation comprises tombstone information 310 about the other user 110' making the collaborative invitation. Tombstone information 310 may comprise, but is not limited to the name, affiliation and contact address of the other user 110'. In some embodiments, the tombstone information 310 further comprises a MORE button 312, with which the user 110 may interact with the input device 232 such that when the MORE button 312 is activated, additional information about the other user 110' may be presented, such as the other user's 110' job title, physical location etc. The representation 295 further comprises a Current Context Box (CCB) 314, for displaying the current context of the communication between the user 110 and the other user 110', and specifically an identifier of the current context, the identifier stored in a CO 280 associated with the current context. In one embodiment, the identifier comprises a name that the originator of the current context has assigned to the current context. Determination of current context is described below.

As depicted in FIG. 1, it will be a common occurrence for the users 110 to be involved in multiple contexts with a collaborator, such as the other user 110'. It will also be common for a collaborative session, such as telephone call and/or an IM session, to move among many contexts sequentially. The context in which a collaborative session begins will often be only the first of several topics of conversation. Hence, the CM 210 is further enabled to allow the user 110 to shift contexts via an interaction with the representation 295. For example, in the depicted embodiment of FIG. 3, the representation 295 further comprises an All Context Box (ACB) 316, which displays a list of identifiers of potential contexts of the collaborative session, which the user 110 may choose from via an interaction with the input device 234.

To compile the list displayed in the ACB 316, the CM 210 will scan the COs 280, (e.g. via requests for information transmitted to the shared memory 270), looking for all contexts associated with the user 110 and/or the other user 110'. For example, the CM 280 requests the identifiers of contexts in COs 280 which are associated with the user 110 and/or the other user 110', and the list is compiled from these identifiers. The user 110 can select one of identifiers in the list to be the current context. For example, via the input device 234, the user 110 can click on an identifier or drag an identifier to the CCB 314. The identifier of the context will then be displayed in the CCB 314, and the CM 210 will understand the current context to be the context associated with the identifier displayed in the CCB 314. The effect of this on the CO 280 associated with this context will be described below.

In some embodiments, the CM 210 is further enabled to allow the user 110 to define a new context for participation via an interaction with the representation 295. For example, in some of these embodiments, the representation 295 comprises a New Context Button (NCB) 318. Upon activating the NCB 318, for example via the input device 234, the user 110 will be prompted to enter an identifier (e.g. a name) for the new context, for example via a pop-up screen. The identifier of the new context will be displayed in the ACB 316. Furthermore, the CM 210 will cause a new CO 280, associated with the new context, to be added to the shared memory 270. At a minimum, the new CO 280 will comprise the identifier of the new context, and an identifier of the user 110 who caused the new CO 280 be created (e.g. a name, an employee number, a phone number etc.). In some embodiments, the new CO 280 will also comprise an identifier of the other user 110' participating in the communication session with the user 110 when the new CO 280 was created.

In some embodiments, the CM 210 is further enabled to allow the user 110 to remove a context for participation from the list displayed in the ACB 316 and/or the context associated with the identifier displayed in the CCB 314, via an interaction with the representation 295. For example, in some of these embodiments, the representation 295 comprises a Remove Context Button (RCB) 320. Upon activating the RCB 320, for example via the input device 234, a highlighted context will be removed the list and/or the CB 314. For example, the user 110 may highlight the identifier of a context displayed in the list and/or the CCB 314 by clicking on the identifier via the input device 234 (e.g. in the depicted embodiment, "CONTEXT GUI PATENT" is highlighted). In some embodiments, the CM 210 will cause the CO 280 associated with the deleted context, to be deleted from the shared memory 270. This feature can be used to delete references to a context that is no longer of use.

The COs 280, and the updating of COs 280, will now be described. As indicated above, the user 110 will be operating in multiple contexts with one or more other users 110. Each of these contexts may be related to an enterprise objective. It is hence desirable and beneficial to assist the user 110 in focussing their attention within a specific context, particularly when they are interrupted by a call or other communication attempt when doing other tasks. Hence, via the CCB 314 of the representation 295 of the CM 210, the user 110 can indicate which context is a current context. Alternatively, the system 200 may determine the current context. This is described in more detail below with reference to FIG. 4. Data associated with the current context is then collected while the current context is active. The data associated with the current context is stored in the CO 280 associated with the current context. Data associated with the current context may include data associated with communications that occur while the current context is active, documents generated while the context is active, a location of the user 110 while the current context is active, activities of the user 110 while the current context is active, and identifiers of other users 110 co-located with the user 110 while the current context is active. A system for collecting certain types of data associated with a current context is described below with reference to FIG. 4.

In some embodiments, data associated with the current context stored in a CO 280 may comprise a reference to data. For example, if a document is generated by the user 110 while the current context is active, the data associated with the current context may comprise a reference to the document (e.g. a network address, a location on a hard-drive, and the like), rather then the document itself.

Hence, by saving data associated with a given context in a CO 280, while the given context is the current context, at a later time the user 110 can quickly be brought up to date with the given context by consulting the data stored in the CO 280. For example, when the context of the user 110 shifts between contexts several times in day, at some point in the day the given context may again become the current context, and hence the user 110 has a record of data available that enables the user 110 to quickly refresh themselves on the given context.

In some embodiments, the data stored in the CO 280 is made available to supporting applications that assist the user 110 in shifting their attention, for example by causing certain views of a context to be displayed, such as all e-mails associated with a context.

Figure 4:
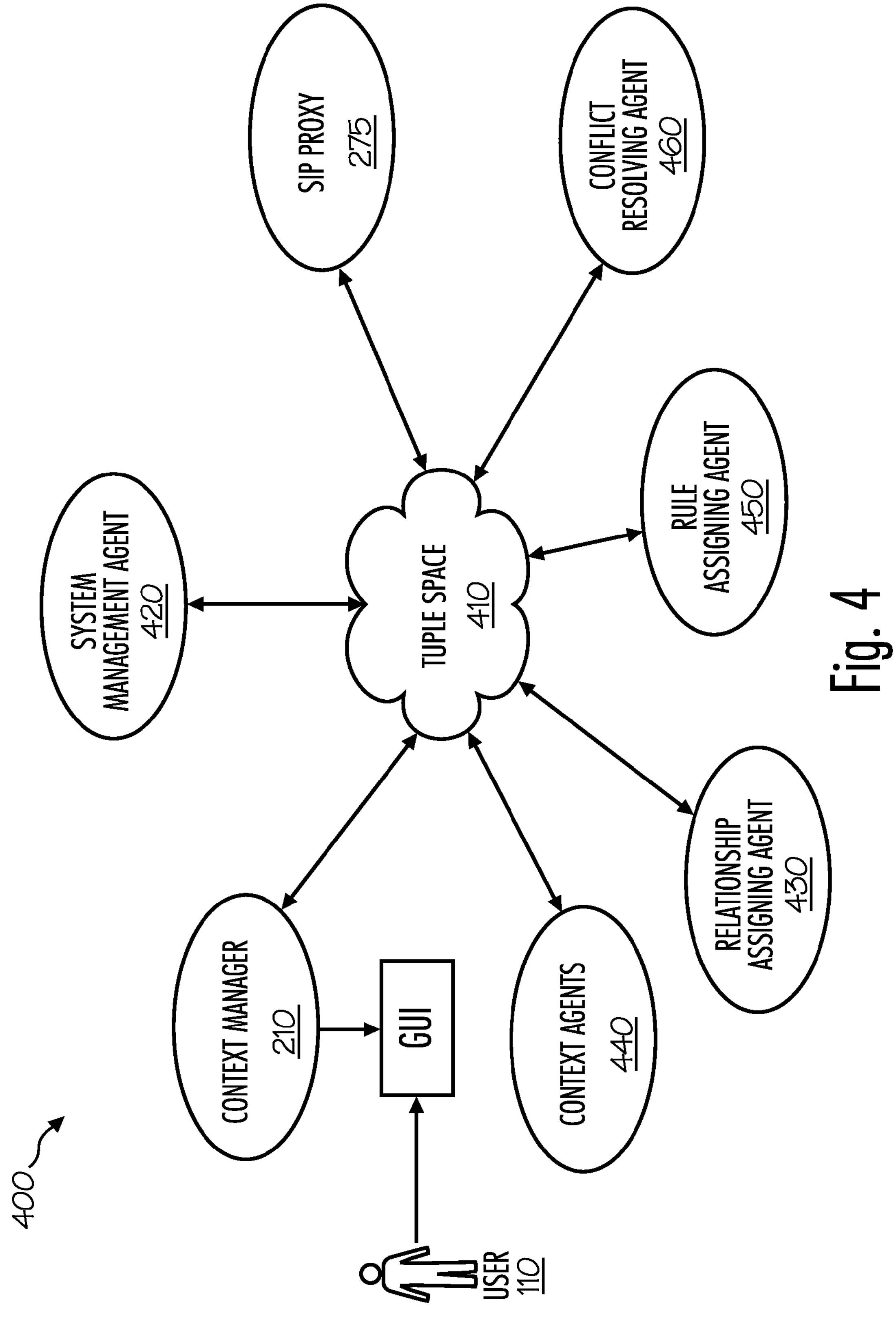
FIG. 4 depicts representation of a context manager, according to a non-limiting embodiment.

Attention is now directed to FIG. 4, which depicts system 400 for managing context, according to a non-limiting embodiment. In some embodiments, the system 200 described above is a subset of the system 400, with like elements having like numbers, in which the shared memory 270 comprises a tuple space 410. A tuple space is generally a type of database in which various assertions (known as tuples) about a state of the user 110 and/or a state of apparatus and systems associated with the user 110 may be posted, including current and previous contexts in the form of the COs 280.

The system 400 is generally adapted from the Applicants co-pending application "Context Aware Call Handling System", U.S. Ser. No. 10/631,834, filed on Aug. 1, 2003 and incorporated herein by reference, which describes the operation of a context-aware call handling system. Present embodiments use the basic structure described in Applicants co-pending application U.S. Ser. No. 10/631,834 for managing context and determining a current context. The basic structure is a blackboard system surrounded by knowledge sources that collect and process contextual information, associated with the user 110 such that a general user context can be identified and within which incoming call attempts can be situated. However, system 400 extends this concept by providing for the possibility of one or more specific contexts within each of which specific objectives can be supported.

System 400 comprises a tuple space 410 to maintain general context and a plurality of knowledge source agents 420-460, described below, which are in communication with the tuple space 410. The context is specified by one or more assertions made by one or more of the knowledge source agents 420-460, that are stored in the tuple space 410, for example as tuples, as known to a person of skill in the art. Some of these tuples are long lived. An example of this would be user role relationships between users 110 (e.g. boss-salesman). Some assertions will be short-lived. Examples of this would be a location of a user 110, which could change on a minute by minute basis. The different contexts may be stored in the tuple space 410 as a CO 280. While COs 280 are not depicted in FIG. 4, it is understood that the COs 280 are stored in the tuple space 410, as in the shared memory 270 of FIG. 2.

All of these assertions are placed in the tuple space 410 by one of the knowledge source agents 420-460 that surround it, or another knowledge source agent as will occur to one of skill in the art. Not all knowledge source agents 420-460 will be able to interpret all contextual assertions. Rather the knowledge source agents 420-460, which need to understand and determine an assertion, will be provisioned with the syntax of the proper assertions. The semantics of an individual assertion can, and likely will, be different for each knowledge source 420-460. Each knowledge source agent 420-460 may use its own semantics to interpret assertions to its own purpose. Hence, a CO 280 need not be strongly structured. Rather, in some embodiments, a CO 280 is semistructured such that items of data stored in the CO 280 will be identified so that applications which need the data may find it. Further, not all applications using the CO 280 need understand all of the data contained within the CO 280. This aids interoperability and evolvability.

In a specific non-limiting embodiment, data associated with a specific context may be stored in a CO 280 as of assertions associated with the specific context. For example, and identifier for a context may be stored in the CO 280 as a key value pair that identifies the context (e.g. at the beginning of the CO 280). This could be of the form:

<Context><123456> which identifies the specific context 123456.

Representation a context within a CO 280 may be tree-based, with specific areas of the CO 280 reserved for specific types of data. Among the data that can be stored within a CO 280 are:

a) Name of a context
b) Purpose of a context
c) Participants in a context
d) Communication attempts in a context As another example within the communication attempt category could be a category in which annotations on the communication attempt could be stored.

For example, the assertion for this would be

<Context><123456>
<Communication_Attempt. <314159>
<Annotation><Discussing UK product launch>

In some embodiments, an identifier for a communication attempt (i.e. "314159" in the above example) may be assigned by a call-processing agent, such as the SIP proxy 275 in the architecture of FIG. 4. The identifier for the communication attempt identifies a specific call attempt. In some embodiments, there may be many such identifiers within a context.

The caller in this communication attempt, for example the other user 110' in FIG. 2, may also be identified with the assertion:

<Context><123456>
<Call_Attempt><314159>
<Participant><Amanda_Slack@mitel.com>

As indicated above, the user 110 may interact with the CM 210 which assists the user 110 in shifting between multiple contexts, via the representation 295, as described above, and further the CM 210 may determine a current context. This will now be described within the framework of the system 400. The SIP proxy 275 (or alternatively a PBX) will receive an incoming call. Using a common gateway interface (CGI), or some other service, the SIP proxy 275 will place assertions about the call within the tuple space 410. In case of a traditional PBX, this may be limited to calling line ID (CLID) and dialled number (from DNIS—dialled number information service). However using SIP or a similar protocol can result in more specific data being supplied, such as call subject, urgency, etc. The result is that the tuple space 410 will now contain a number of assertions that describe the call.

The knowledge source agents 420-460 will now be described. In general, the knowledge source agents 420-460 do not have to be installed on a particular computing device, but can be distributed over a network of computing devices, which have access to the a server processing the tuple space 410 (i.e. a server which comprises a shared memory where the tuples are stored and processed). The knowledge source agents 420-460 will have access to various evidentiary sources that can be used to make surmises about user context. Examples of evidentiary source include, but are not limited to:

1. Contents of a user's calendar
2. Contents of other users' calendars
3. Socially aware observations and surmises from the user's current context
4. User declarations A System Management Agent (SMA) 420 synchronises the behaviour of the other agents 430-460 surrounding the tuple space 410 in regard to the handling of communications (e.g. telephone calls, SIP requests, etc.) and determining contextual data. The SMA 420 will trigger the agents 430-460 at the appropriate time to evaluate the information currently in the tuple space 410 and to make further assertions that collectively describe a communication. Specifically the Relationship Assigning Agent (RAA) 430 and one or more Context Agents 440 will be triggered to evaluate the current assertions and relate an incoming communication to the current context of the user 110. In some embodiments, each client (e.g. such as the computing device 230) is associated with a SMA 420.

The Relationship Assigning Agent (RAA) 430 is generally enabled to respond to a relationship-assigning request from an SMA 420. The request from the SMA 420 generally contains caller and receiver information. The RAA 430 assigns the relationship between the user 110 and the caller, for example according to a buddy-list of the user 110 or according to another list of relationship data, for example a company organizational chart.

One or more context agents 440 are enabled to monitor the activity of users 110. For example, the context agents 440 may determine where the users 110 are, who they are with etc., and make assertions about context to the tuple space 410. Hence the context agents 440 may have access to a schedule of the user 110, a location determining device associated with the user 110 (e.g. a GPS device enabled for wireless communication), webcams, keyboard activity detection agents etc. This data may be stored at a CO 280 associated with the current context, while the current context is active.

The Rule Assigning Agent 450 is enabled to extract matching user rules according to the conditions of each rule and the current context, and assign them to a relevant data field for call processing and determination of context.

A Conflict Resolving Agent (CRA) 460 is enabled to resolve conflicts that might be present in the assigned rules.

Again, by context, it is meant where the user 110 is, and/or what the user 110 is doing, whom the user 110 is with and what can be deduced from this data. The "what" and the "who" of context may go beyond raw data, however. The Context Agent 440 will contain IF-Then rules or policies that relate more concrete facts to more abstract concepts. For example, if a location aware context agent 440 determines that the user 110 is in a specific room (say 603-1), a context agent rule may identify room 603-1 as a meeting room and make an assertion about the user 110 being within a meeting room, and further that the user 110 is in a meeting. This data may then be saved in the CO 280 associated with current context, while the current context is active.

Similarly the RAA 430 has a plurality of rules that can take evidence about a call and relate the caller with the user 110. For example, rules may relate the calling number (e.g. 613-592-2122 as in FIG. 3) to being the telephone number of a specific person (e.g. Amanda Slack, also as in FIG. 3).

In turn, other rules can relate the caller to being the supervisor of the user 110. This data may then be saved in the CO 280 associated with current context, while the current context is active.

Thus the interoperation of the context agent 440 and the Relationship Assigning Agent 430 can take some of the cursory information available with an incoming call (e.g. the CLID) and fit the call into the current context of the user 110. Further, the data associated with the call may be saved to the CO 280 associated with the current context. So a call from (613) 592-2122, which intrinsically provides only limited guidance, is transformed into a call from the supervisor of the user, while the user 110 is in a meeting room. Such data stored in the CO 280 may be later retrieved by the user 110 and to assist the user 110 in remembering events and other data associated with a specific context. Other information may also be supplied and manipulated by rules. For example, who the user 110 is with while a current context is active, the subject of a call or communication that occurs while a current context is active, the documents that the user is working on while a current context is active. Together the data, and derived assertions, fit the call into the user's current working and social context.

Using these assertions, the Rule Assigning Agent 450 will determine which of the policies that are supplied to the system 400 are appropriate to the current communication. Typically, multiple rules will apply to a call. The CRA 460 will then determine which rule should have priority. It will then supply this to the SIP proxy 275 (or PBX) for action.

As depicted, the CM 210 will also be in communication with the tuple space 410, and further, in this embodiment, the COs 280 associated with a user 110 are stored as sets of assertions within the tuple space 410. The CM 210 will have access to and be able to interpret the assertions in the COs 280, as well as assertions that the CRA 460 uses to instruct the SIP proxy 275 for action.

When an incoming communication occurs, the CM 210 can be triggered in sequence by the SMA 420 to understand that the CRA 460 (or another knowledge source agent) will be placing an assertion for action in the tuple space 410. The CM 210 will detect that that this assertion is directing the SIP proxy 275 to send the communication directly to the user 110 (e.g. to the computing device 230 and/or the communication device 232). The CM 210 will also be able to determine from assertions in the tuple space 410 a user 110' associated with the incoming communication is (e.g. Amanda Slack in the example). The CM 210 will then scan COs 280 residing within the tuple space 410 for an association with the user 110' (that is whether they are in a participant list of a particular CO 280, which is associated with the user 110). The CM 210 will then display data associated with the user 110' in the tombstone information 310 of the representation 295 of FIG. 3, and names of contexts associated with the user 110' will be extracted from the appropriate assertion within the COs 280 and displayed in the ACB 316 of FIG. 3.

In some embodiments, the current context of the user 110 may also be determined via the system 400. Further, when the current context is determined, an identifier of the current context may be stored as an assertion within the context of the user 110 in the tuple space 410.

In some embodiment, current context may be determined through the addition of a context header to a SIP INVITE message, within the SIP protocol. The context header will contain an identifier of the context of the communication and hence the current context of the user 110 (presuming the communication is accepted). The content of the context header will be supplied to the tuple space 410 by the SIP proxy 275 as part of the invitation process. If the CM 210, while processing an invitation, finds a valid context identifier within it, it will set this context as the current context for the user. That is, within the tuple space 410, it will set the Current Context Assertion to this context, and display the context's identifier in the CCB 314 of FIG. 3. If the context header in the contains an identifier of a context which is not found within the contexts whose COs 280 are in the tuple space 410, the CM 210 will assume that a new context is to be created, and hence a new CO 280. Thus, the CM 210 will trigger the creation of a new CO 280 for that context in the tuple space 410 and will then carry on with displaying the context information at CCB 314.

However, if the invitation does not contain a context header, or if the context header is a null, then the Current Context assertion will be set to null and the CCB 314 will be left blank. The current context may then be determined via data received from the input device 234 when the user 110 interacts with the input device 234, as will now be described.

It will commonly be the case that, during the course of a communication/interaction, the participants will wish to change contexts. Users 110 will typically be involved in multiple contexts with others users 110 within and without an enterprise and will be shifting their attention between them. Hence, to change contexts, one or more of the users 110 in the communication will select a context identifier from the list displayed in the ACB 316 and cause this identifier to be displayed in the CCB 314 via an interaction with the input device 234 (e.g. by dragging it to the CCB 314 or double clicking on it). If only one user 110 in the communication performs this action, the CM 210 associated with this user 110 may then transmit a message to a CM 210 associated the other participant (or participants), which may then cause the current context of the other participant(s) to also change. In any event, the CM 210 will then cause a Current Context assertion in the tuple space 410 to be set to the selected context and also cause this to be displayed in the CCB 314. Further, any data associated with the new context that is collected while this selected context is active as the current context will be saved to the CO 280 associated with the selected context. This technique may also be used to define a current context when there is either no context header in the invitation, or if the context header is a null.

As described above, in some embodiments, the user 110 may create a new context via activation of the NCB 318. The user 110 will then be prompted for the name of the new context. The new context will be created with a CO 280 created for it in the tuple space 410. The user 110 may also be prompted for other pertinent information such as the purpose etc. In other embodiments, a new context may be created via the user 110 selecting the field of the CCB 314 via the input device 234, and entering a new context identifier.

While some of the techniques described for determining current context are based on SIP INVITE message in some embodiments, SIP may not be the protocol used in the system 400. For example, rather than SIP, data about a communication may be provided in the Calling Line ID, ANI (Automatic Number Identification) or other signalling constructs. These may also be used to identify a caller and to assist in determining current context. Further a P2P system (e.g. as described below) can also be used to determine current context. However, in embodiments where no information is available to identify the incoming caller, current context can be determined manually, as described above.

In some embodiments, the system 400 is enabled to make a 'best guess' of the initial current context for those systems in which SIP (or equivalent) is not used, or when the context header is not provided or is a null. The tuple space 410 generally retains a history of collaborations and thus stores data which may be processed to make such a best guess, such as in the COs 280, and other assertions. For example, in some embodiments, the tuple space 410 retains an assertion as to the last context that the user 110 used with the caller. In these embodiments, this last context may be set to the current context during the next communication between the user 110 and the caller. In another embodiment, the tuple space 410 is the first context to which the user 110 turned during the last communication with the caller. In these embodiments, this first context may be set to the current context during the next communication between the user 110 and the caller. In yet further embodiments, the tuple space 410 may maintain a data structure in which the cumulative time used for given contexts is stored, for example within each CO 280. In these embodiments, the context that is the most utilized context may be set to the current context during the next communication between the user 110 and the caller, on the assumption that this context is the most important in the caller-user relationship. Other methods of determining current context via a best guess are within the scope of present embodiments.

While many of the embodiments described heretofore reference communications involving voice communication (e.g. telephone calls), context may also be managed for other types of communications, for example, multimedia, IM, Email etc. In these embodiments, the identity of the communicating user may be determined via data received from the communicating user (e.g. in the FROM header of the Email) and the context selected accordingly. In this way the user 110 can see (e.g. by retrieving the CO 280 associated with the context associated with the communication) and interact with the history of the collaboration while viewing the current communication.

Embodiments described heretofore reference communications between users 110 that are human users. However, in other embodiments, context may be managed for communications associated collaboration between a human user and a business process system or automated system, which will generally be referred to as robots. For example, a robot may be enabled to create a context to assist it with scheduling the actions of one or more human users. They robot may be further enabled to create communications (recorded, voice, text etc) that provide information to users 110 as to a current activity in the context supporting the process. Users 110 may view their contexts and maintain the history of activity within the context associated with the robot, and other users 110 or other robots, in order to focus the attention of the user 110.

As described above with reference to COs 280, a context may be associated with a number of participants. Participants will come and go as they are invited into the context, accomplish their designated tasks and drop out of the context. A CO 280, as described above, contains records that detail each of the participants, a description of the context (purpose, participating nodes/computing devices) and a history of the interactions (annotations of specific collaborations). Hence, the CO 280 acts as a central repository that will enables humans, robots and applications which are enabled to process data in the COs 280 and to interact and collaborate. Thus in some embodiments, a portion of a CO 280 may be dedicated to a specific context belonging to each participant that will contain common information for all participants. For example, every CO 280 for a specific context contains annotations for all calls and other collaborations that have taken place within the specific context. Hence, a supporting application may be enabled to a user 110 with a representation of all calls and/or data that occurred within a specific context. While this has already been described in general above, in a particular non-limiting embodiments, to provide a common basis for all COs 280, each context will be supported by a P2P network linking all users 110. This P2P network may be created, operated and managed in a manner similar to the P2P network described in from the Applicants co-pending application "CONFIGURATION OF IP TELEPHONY AND OTHER SYSTEMS", U.S. Ser. No. 101/781,319, filed on Jul. 23, 2007 and incorporated herein by reference.

The structure of this P2P network includes an elected master node enabled to receive updates, which in turn distribute the updates to participating nodes (i.e. computing/communication devices and/or servers). A node is generally understood to be a computing device comprising a memory, a communications interface and processor. Each participating node will have a publication/subscribe relationship with the master node. Each participating node will publish any relevant updates to the master node and it will in turn notify all other participating nodes of the update. Hence, COs stored at each participating node may be updated in a similar manner, and hence all participating nodes will have common COs 280 maintained to the same state, and further a CO local to a participating node will be associated COs at other nodes. In some embodiments, this enables a tuple space comprising the COs to be maintained over a plurality of nodes.

By using an elected master node, the problem of race conditions in the maintenance of a state of a CO is addressed. In addition, the amount of bandwidth and processing consumed is reduced. In its simplest form, as known to a person of skill in the art, a race condition is a condition where two processes use a shared resource on a computer at the same time but are dependent upon each other to complete their task. For example, in some embodiments, participating nodes may be elements of a mesh network. In these embodiments, each participating node would notify all other participating nodes of updates. However with participating nodes coming and going, the issue of race conditions arises. It would hence be difficult to ensure that all nodes have the same participant list, and so some COs 280 may miss updates that occur soon after they join a context. The elected master node architecture addresses this issue.

Within this architecture a node may be invited into a context by an initial invitation, for example sent from the master node or another participating node. The invitation, containing a context name that the node has not seen before. The node will thereby create a context/CO for the new context.

The newly created CO can then be linked to the P2P network and thereby receive the common contexts (i.e. data in associated COs stored in other participating nodes). In a SIP-based P2P system, a header can be defined for the invite message that will contain the URL or IP address of the master node: a "Current P2P Master header". Using the URL or IP address, the node can use standard SIP event notification control messages to set up a publish/subscribe relationship with the master node. The node will then be notified of the common content of the other COs 280 and update the local CO 280.

In non-SIP systems, caller ID (or similar information) may be used to identify the source of the incoming invitation. In these embodiments, the node can use a directory (ENUM or other) to determine the URL or IP address that can be used to address the node which originated the incoming invitation. The node will then request (using a SIP notify equivalent or other message), from the node which originated the incoming invitation, the URL or IP address of the current master node. The node can then join the network as described above.

When a node is removed from a context, the node that is being removed may send an update to the other nodes within a list of all participating nodes stored in a local CO, to this list with its own name removed. The node also generally ends the publish/subscribe relationship with the current master node.

A node which creates a context/CO will, in some embodiments, make the first invitation to another node to join the context. The initiating node will declare itself the master node and use this as part of the process of entering the first node into the P2P network. From then on, the P2P network will function as described above, with new master nodes being elected and nodes coming and going, as desired.

Figure 5:
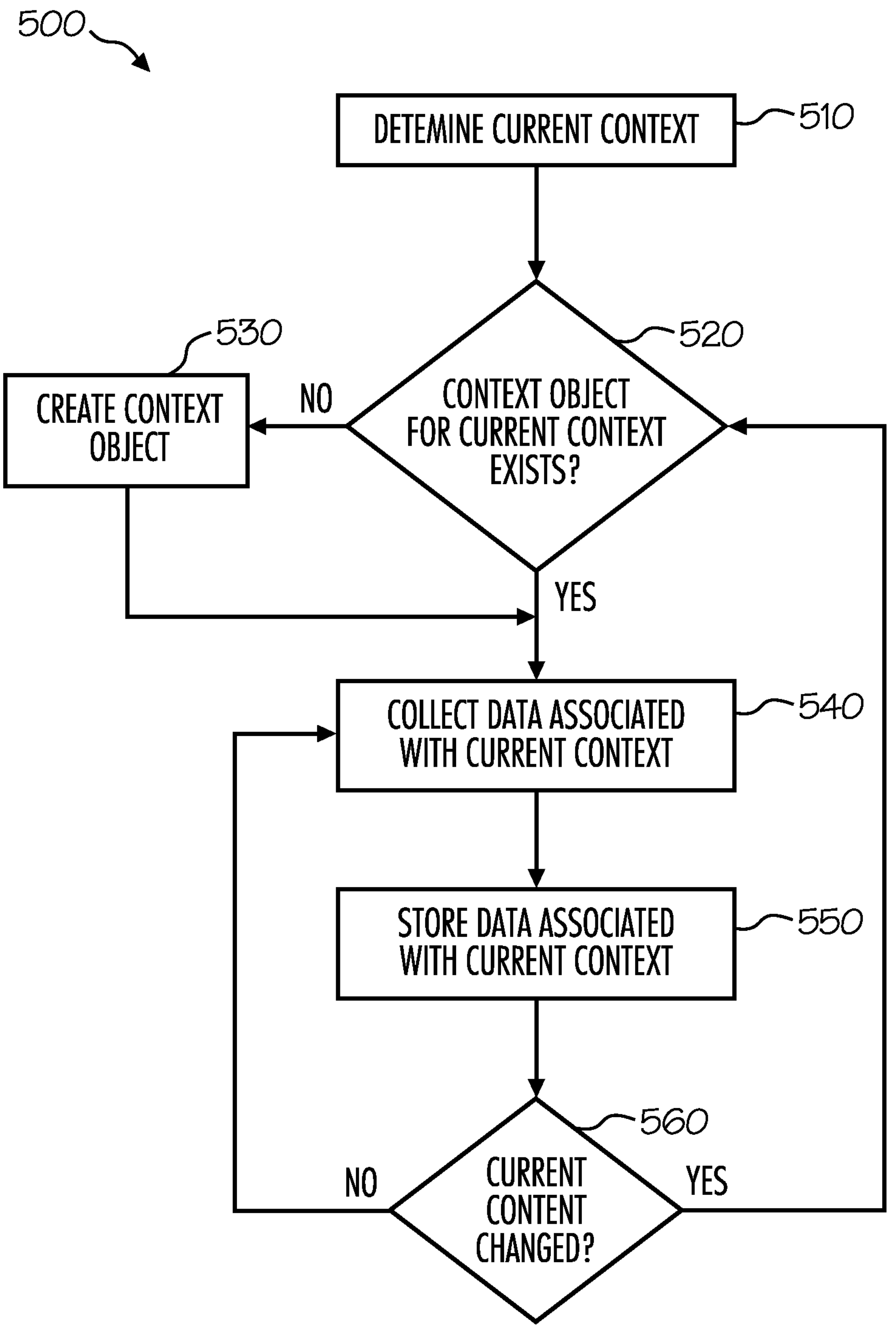
FIG. 5 depicts a method for managing context, according to a non-limiting embodiment.

Attention is now directed to FIG. 5, which depicts a method 500 of managing context, according to a non-limiting embodiment. In order to assist in the explanation of the method 500, it will be assumed that the method 500 is performed using the system 400. Furthermore, the following discussion of the method 500 will lead to a further understanding of the system 400 and its various components. However, it is to be understood that the system 400 and/or the method 500 can be varied, and need not work exactly as discussed herein in conjunction with each other, and that such variations are within the scope of present embodiments.

At step 510 a current context is determined, for example by receiving input data from a user 110 via the input device 234, by receiving a SIP Invite with a context header, or by making a "best guess", as described above. The current context may then be displayed in the CCB 314 as described above, along with any tombstone information.

At step 520, it is determined if a context object, such as a context object 280, associated with the current context exists in a database, such as the tuple space 410 or another database. If the context object does not exist, the context object is created at step 530 in the database. While the current context is active, data associated with said current context is collected at step 540, as described above. At step 550 this data is stored in the context object, thereby creating and/or updating a history of the current context. At step 560, it is determined if the current context has changed, for example by determining if the user 110 has caused a different context identifier to be displayed in the CCB 314, as described above. If not, data continues to be collected at step 540. If so, then at step 520 it is determined if a context object exists for the new current context. Thereafter, the method 500 proceeds as described above. Hence, a user 110 may cause a history and/or updates to a history of a context to be stored in a context object for later reference, for example using an application. The method 500 may end/be interrupted before during or after any step by closing the CM 210, e.g. by closing the representation 295.

Figure 6:
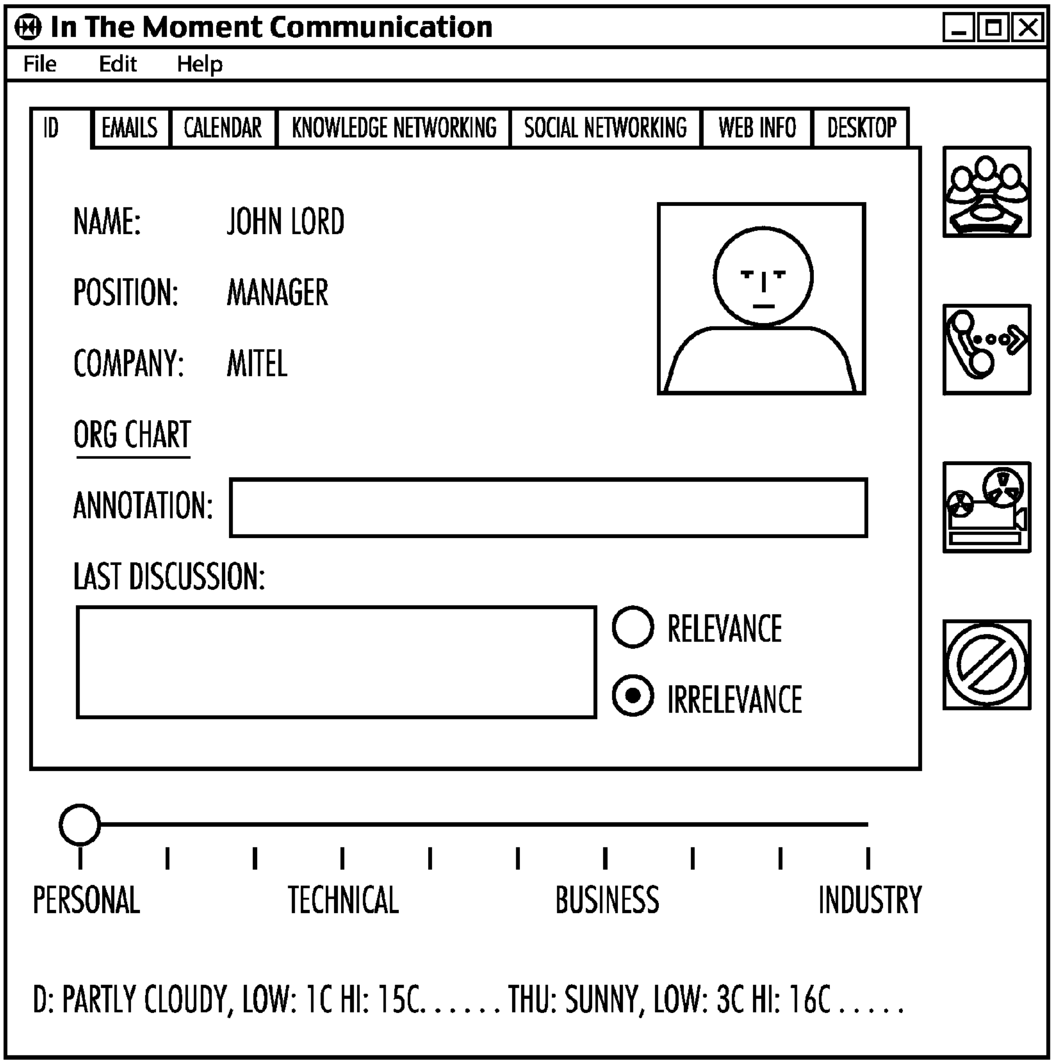
FIGS. 6 through 11 depict views of a GUI of an application for managing context, according to a non-limiting embodiment.

FIGS. 6 through 11 depict non-limiting embodiments of a graphical user interface (GUI) of an application for managing context, according to a non-limiting embodiment. For example the application may be enabled for processing a CO to present data associated with a context within the GUI, and specifically to control a display device to display such data. The GUI is structured in a tab format such that each tab presents a different view of a context and/or additional information associated with a user of the application. A user may switch between tab views by using a pointing device to "click" on a tab. FIG. 6 depicts an ID tab, according to a non-limiting embodiment, which displays information associated with the user of the application, including but not limited to a name, company and position of the user. The tab further comprises an annotation field which allows the user to enter a context identifier. The application received the context identifier and retrieves a CO associated with the context identifier (e.g. from a tuple space or other database). By entering the context identifier the user indicates his/her desire to view the history of the associated context.

Figure 7:
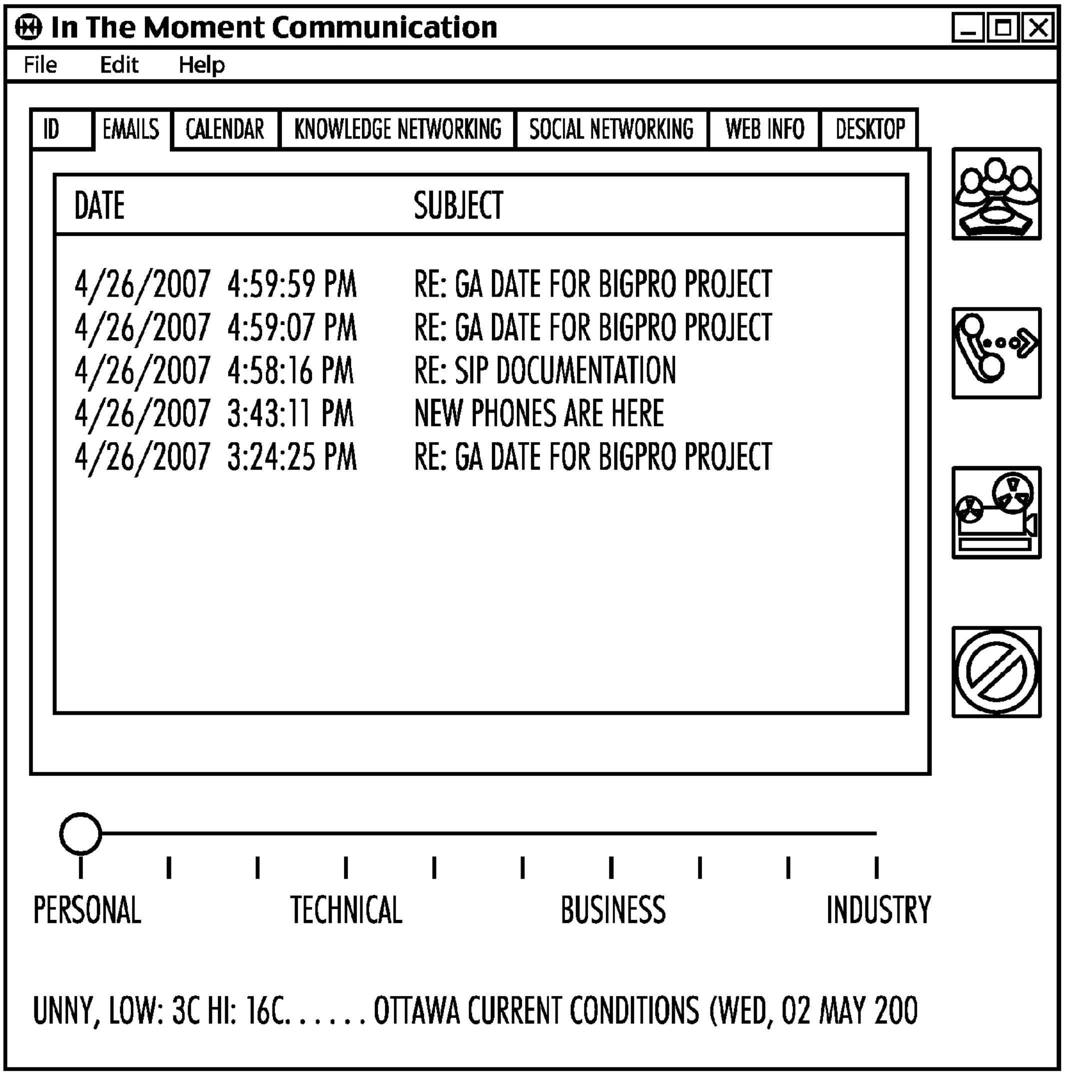

FIG. 7 depicts an e-mail tab, according to a non-limiting embodiment, which displays identifiers of e-mails (or other communications) associated with the context entered on the ID tab. For example, identifiers of e-mails stored in the retrieved CO may be displayed on this tab. If the user chooses a particular identifier, the application may be enabled to the retrieve the chosen e-mail (either from the CO, if stored there, or at an address stored in association with the identifier in the CO) and display it. Alternatively, the application may cause an e-mail application to open, which will in turn display the chosen e-mail.

Figure 8:
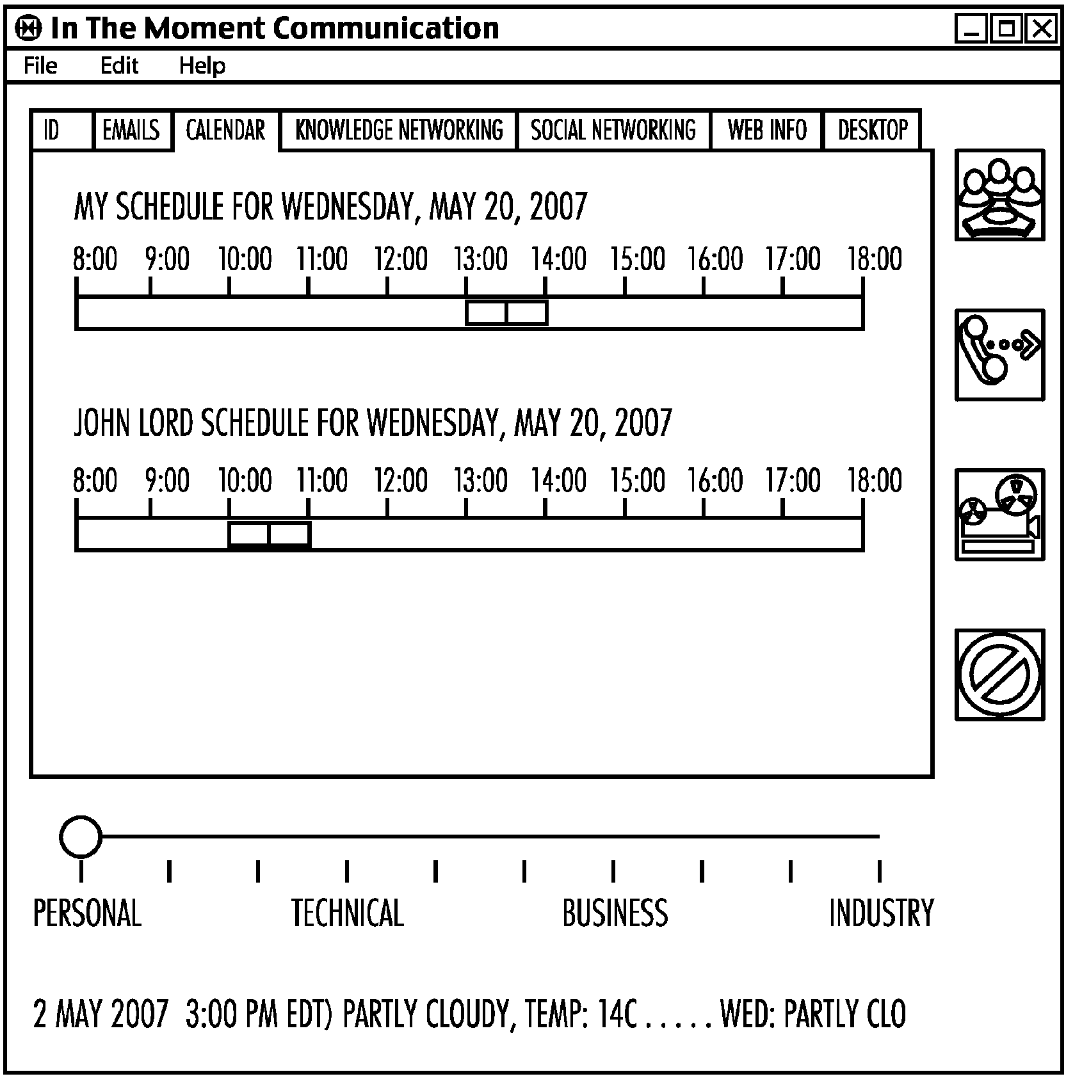

FIG. 8 depicts a calendar tab, according to a non-limiting embodiment, which displays calendar information of users/participants associated with the context entered on the ID tab. For example, the application may process the retrieved CO to determine participants and/or participant identifiers, and retrieve calendar information associated with each participant for display on the calendar tab.

Figure 9:
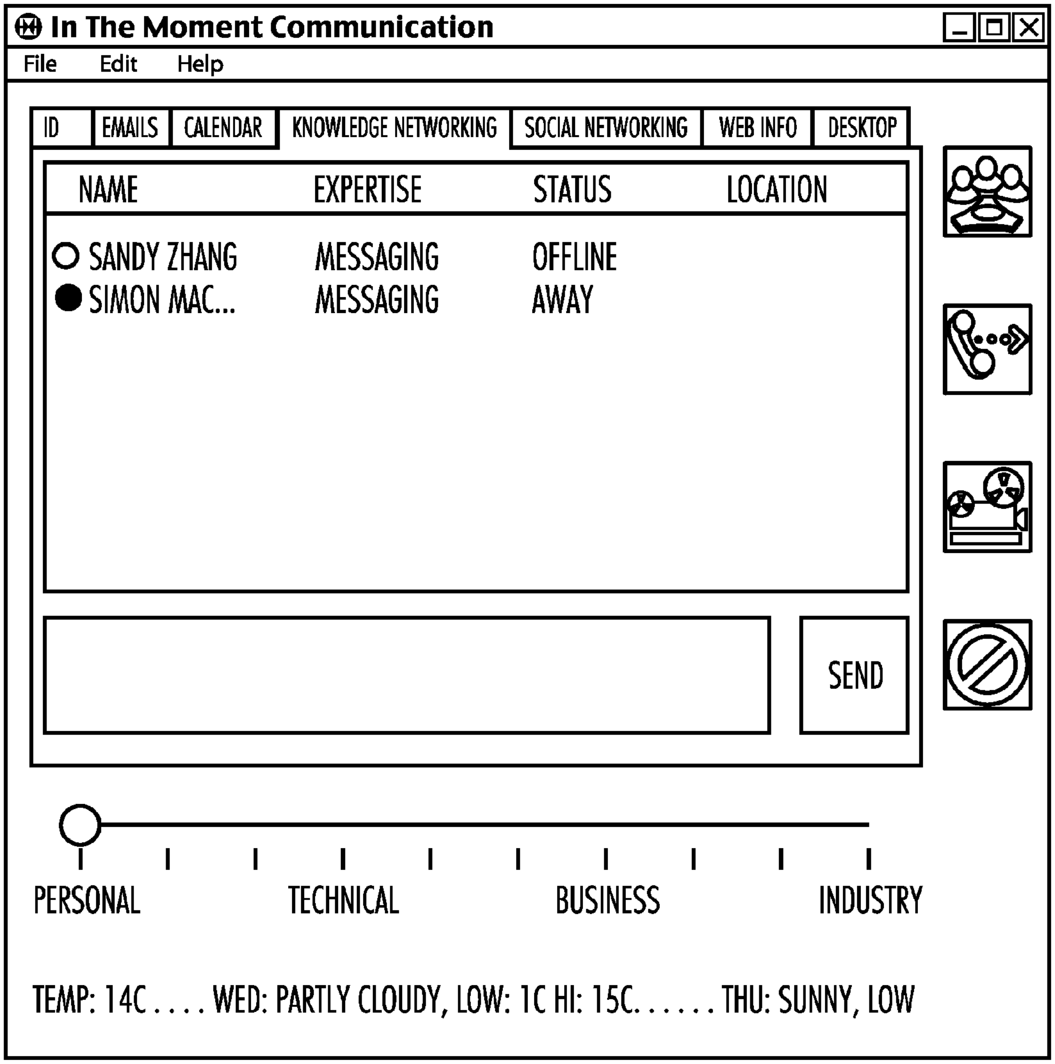

FIG. 9 depicts a knowledge networking tab, according to a non-limiting embodiment, which displays identifiers and status of users who have expertise associated with the context entered on the ID tab. For example, the application may process the retrieved CO to determine what expertise is associated with the retrieved CO (in this example, "messaging"), and then initiate a search with an organization database. Names of status (if available) of individuals associated with this expertise in the organization database may then be displayed on the knowledge networking tab.

Figure 10:
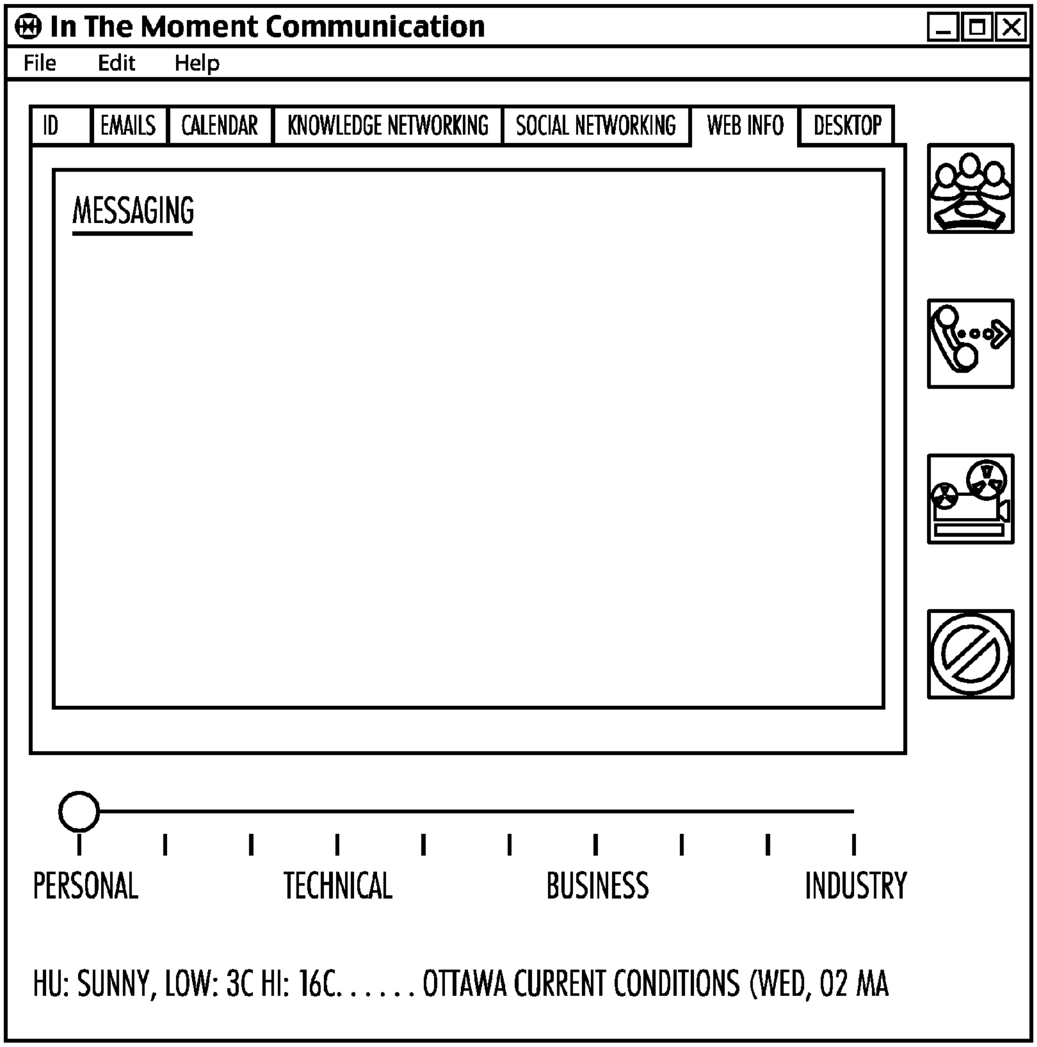

FIG. 10 depicts a Web Info tab, according to a non-limiting embodiment, which displays an identifier of the context entered on the ID tab, and in some embodiments all identifiers of contexts that have been entered on the ID tab over a period of time: e.g. the Web Info tab maintains a history of identifiers of contexts entered on the ID tab. A user may initiate a web search by selecting the identifier, which causes the application to trigger a web search, e.g. via a web search application. Furthermore, the web search may be modulated based on the position of a slider 1010, described in further detail below.

Figure 11:
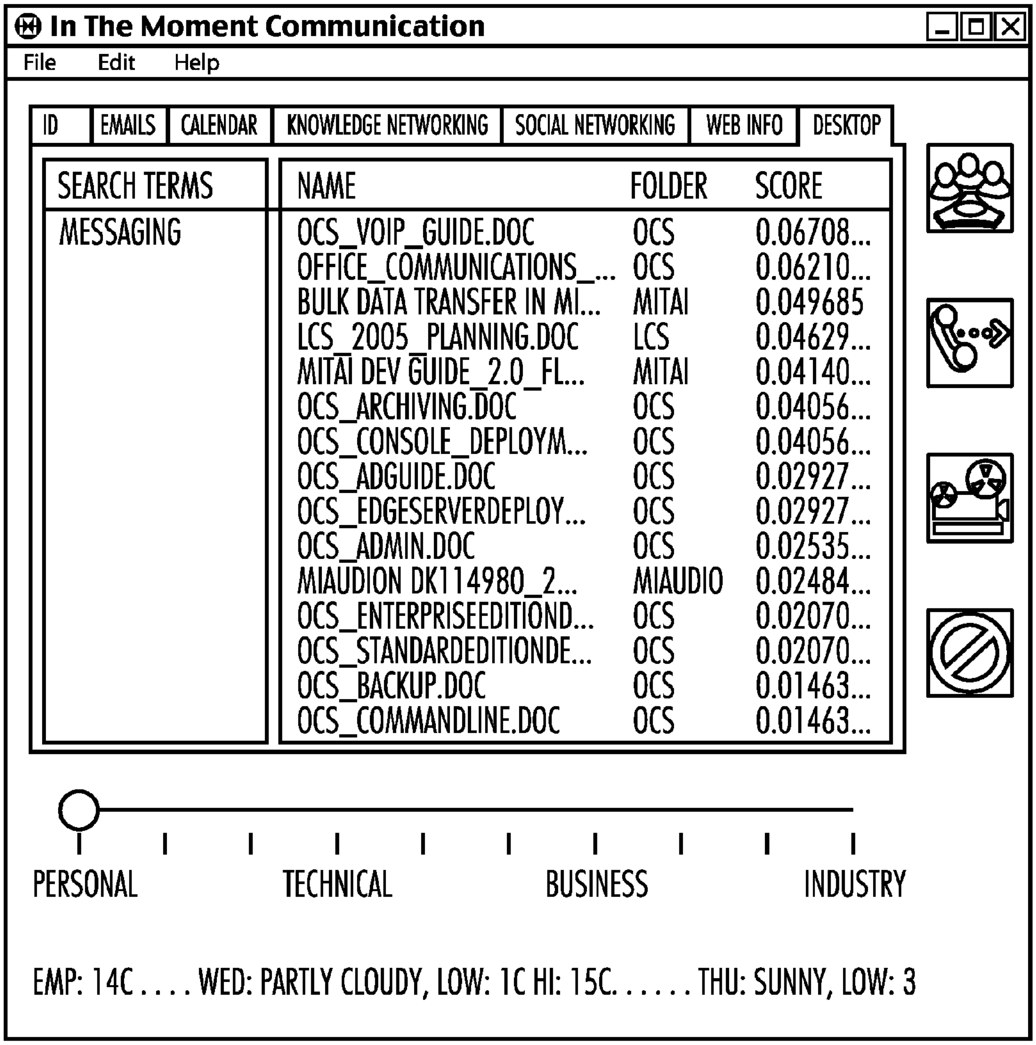

FIG. 11 depicts a desktop tab, according to a non-limiting embodiment, which displays identifiers of documents associated with the context entered on the ID tab. Such identifiers may be retrieved, and the documents accessed, in a manner similar to retrieving e-mail identifiers described above with reference to FIG. 7.

Figure 12:
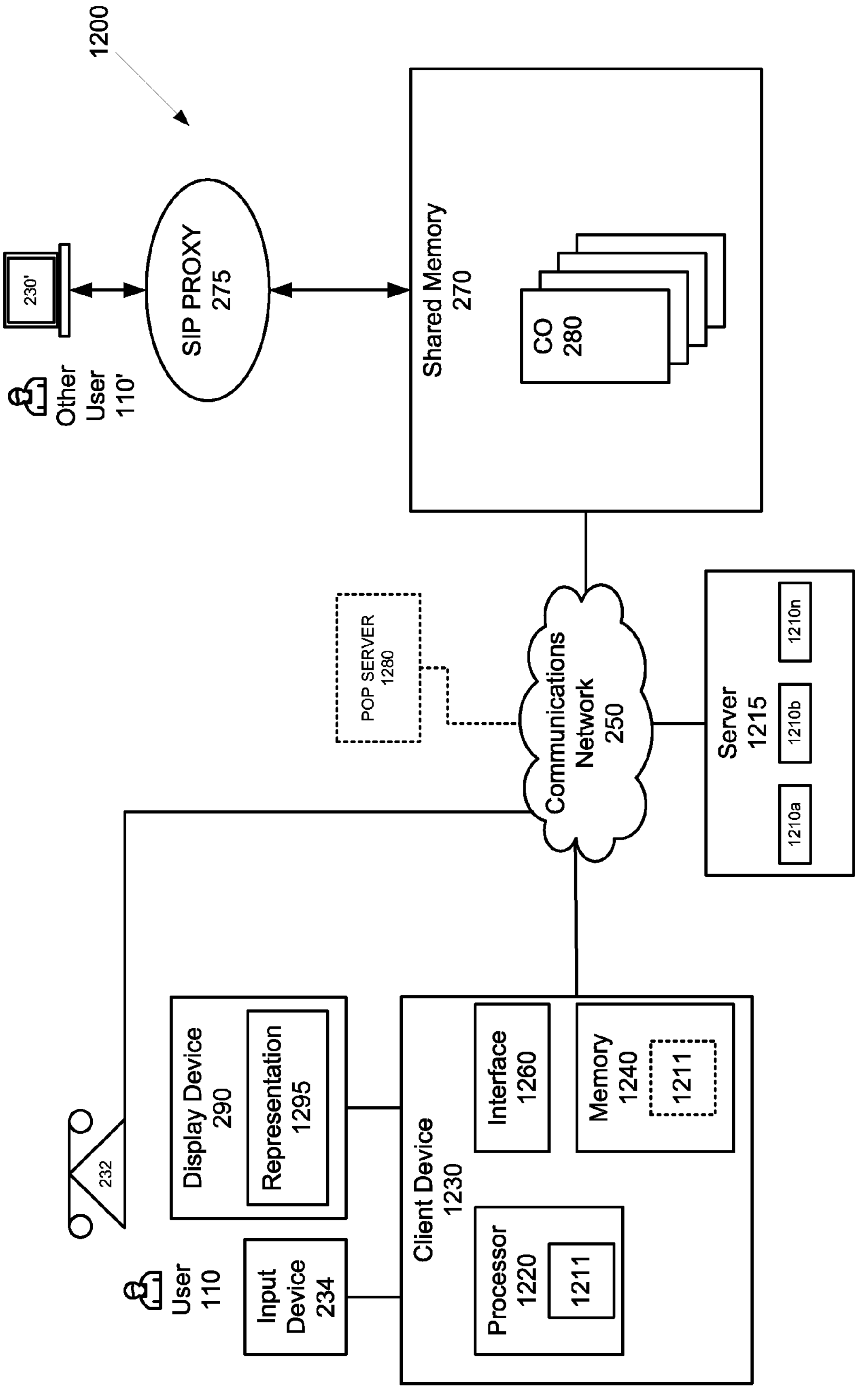
FIG. 12 depicts a system for controlling an application at an electronic device, according to a non-limiting embodiment.

Attention is now directed to FIG. 12, which depicts a system 1200 for managing at least one application 1210*a*, 1210*b*, and 1210*n* (generically an application 1210 and collectively applications 1210), according to a non-limiting embodiment. The system 1200 is similar to the system 200 with like elements having like numbers. While the system 1200 comprises three applications 1210, the number of applications 1210 is not particularly limiting, and can be as few as one application 1210. System 1200, as depicted, comprises a client-server environment, with the applications 1210 residing at a server 1215, and a harness application 1211 (described below) residing at a client device 1230, the harness application 1211 in communication with the applications 1210 via the communications network 250. However, in other embodiments, the harness application 1211 and the applications 1210 may reside at the same electronic device (e.g. the client device 1230). Furthermore, the applications 1210 may be distributed between a plurality of electronic devices, as desired, with one or more applications 1210 residing at the client device 1230 and one or more applications 1210 residing at one or more different electronic devices.

The client device 1230 is substantially similar to the computing device 230 of system 200, while the processor 1220, the memory 1240 and the interface 1260 are substantially similar to the processor 220, the interface 260 and the memory 240, respectively, described above. Furthermore the client 1230 can comprise any suitable combination of personal computing device, laptop, and mobile electronics device (PDA, cellphone and/or a combination).

Figure 13:
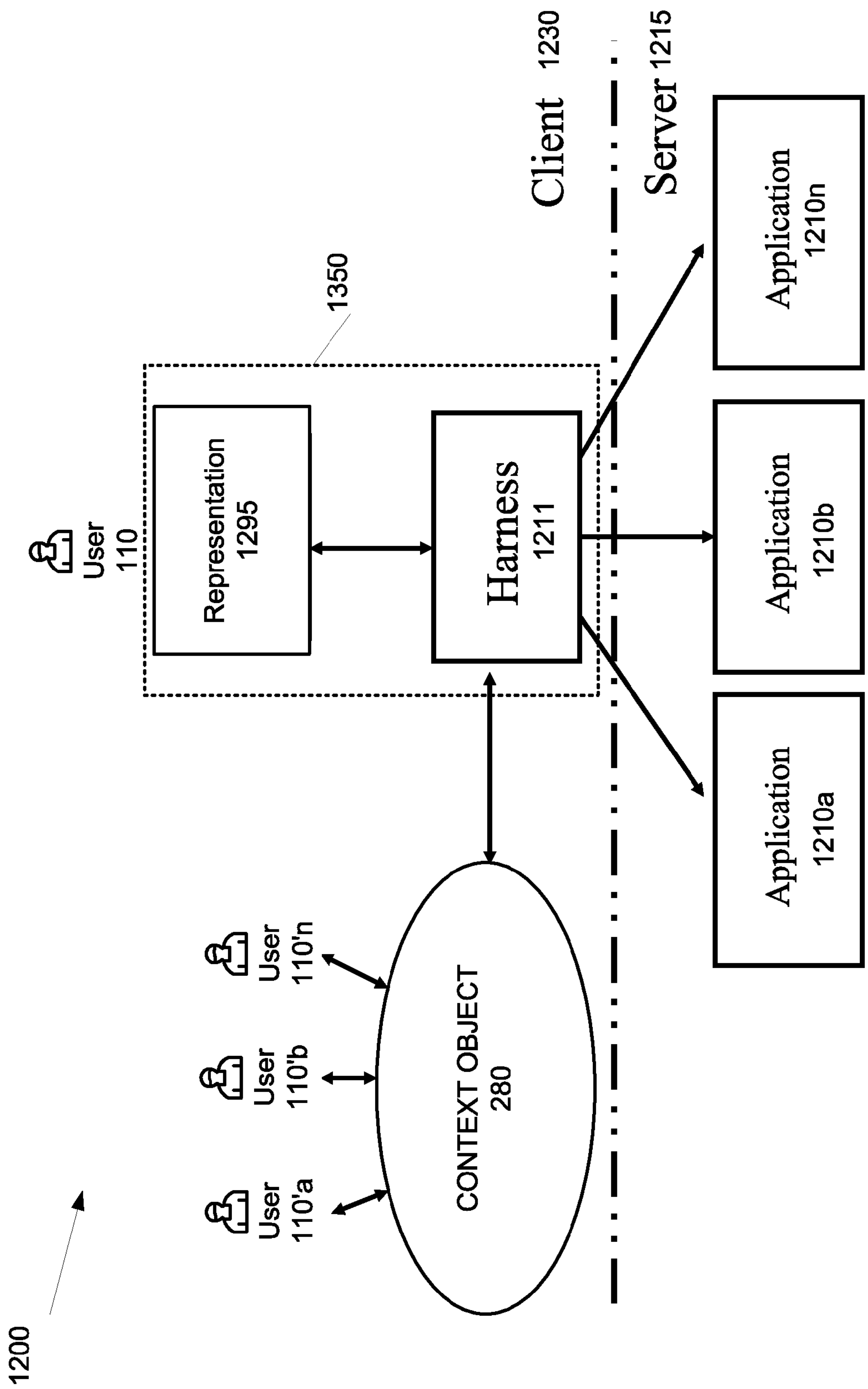
FIG. 13 depicts the software architecture of a system for controlling an application at an electronic device, according to a non-limiting embodiment.

FIG. 13 depicts a block diagram of the software architecture of the system 1200, according to a non-limiting embodiment: the harness application 1211 has access to context data from the context object 280 (e.g. via the communication network 250), with the context object 280 updated by electronic devices (e.g. the communication device 230') associated with other users 110'*a*, 110'*b* . . . 110'*n* (generically, another user 110' and collectively, other users 110'), as described above. As also described above, a context object 280 may be associated with a number of participants (e.g. the user 110 and the other users 110'), and the context object 280 acts as a central repository for context data associated with a given context. The harness application 1211 is generally enabled to interface between the context object 280 and the applications 1210, and retrieve context data from the context object 280. In some embodiments, the context object 280 may comprise an active context object and/or the context object 280 may be associated with a current context. In some embodiments, the harness application 1211 may be enabled to present options to the user 110 which are tailored to his/her current needs, for example by controlling the display device 290 to display a representation 1295 of the options and/or at least one application 1210.

In particular, the harness application 1211 is enabled: to retrieve context data from the context object 280; modulate behaviour of at least one of the applications 1210, based on the retrieved context data; and/or populate at least one data field in the at least one application 1210 with the context data. Hence, once a context is determined (e.g. via the representation 295 of FIG. 3, or via some other suitable determination method), and an application 1210 is processed, the application 1210 may be controlled by the harness application 1211 to populate data fields with data pertinent to the current context and/or feature sets may be enabled and other feature sets disabled according to the current context. Hence, the user 110 is freed from having to manually configure each application 1210 for each context. Furthermore, context data may be shared between applications 1210 via the harness application 1211, such that individual customization of each application 1210 is no longer necessary.

In a particular non-limiting embodiment, the harness application 1211 enables the coordination of the applications 1210 to create a single overall application 1350, for example the application for managing context, the GUI for which is depicted in FIGS. 6-11, described above, and, as well the selection of a suitable application 1210 from the available applications 1210 for performing a specific function. FIG. 13 shows diagrammatically that the harness application 1211 is able to access the (e.g. currently active) CO 280 and use context data retrieved therefrom to offer the user 110 options tailored to his needs, by controlling the display device 290 to generate the representation 1295. The context data is generally derived from the user's 110 previous interactions with his/her colleagues (other users 110') in the context. Hence the overall application 1350 comprises the harness application 1211 and is enabled to control the display device 290 to generate the representation 1295, which is in turn configured to represent views of the applications 1210 controlled and coordinated by the harness application 1211.

Furthermore, the interaction of the harness application 1211 with the applications 121 also generates context data, which is in turn stored in the CO 280. For example the harness application 1211 is further enabled to update the CO 280 with new context data, the new context data representative of the collaboration between the users 110 and 110', such that details of the collaboration can be later determined.

Figure 14:
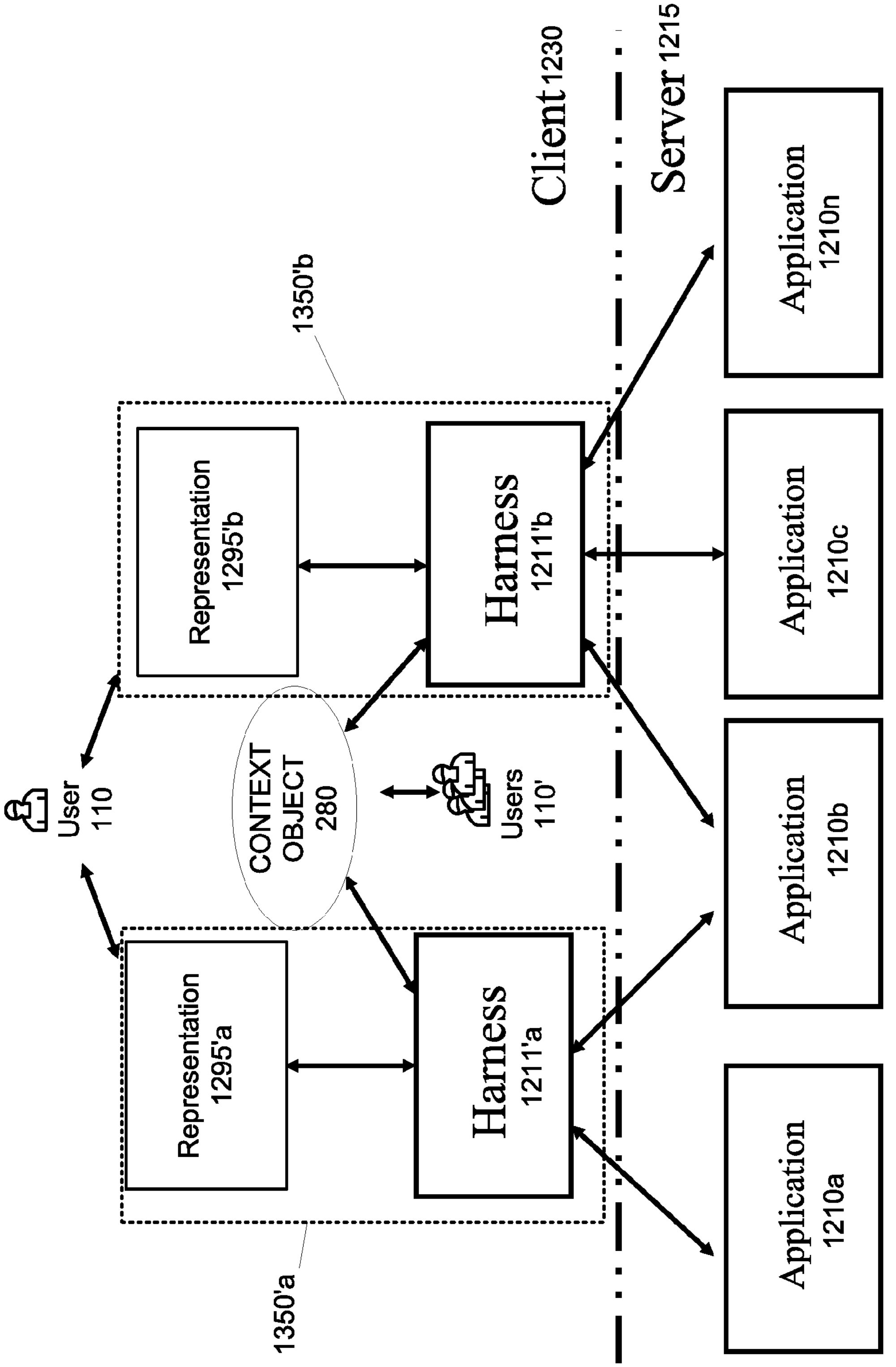
FIG. 14 depicts the software architecture of a system for controlling an application at an electronic device, according to a non-limiting embodiment.

FIG. 14 is substantially similar to FIG. 13, with like elements depicted with like numbers, however the system of FIG. 14 comprises more than one overall application 1350'*a* and 1350'*b*, similar to overall application 1350, which may be offered to the user 110 in a similar manner (i.e. with each overall application comprising a harness application 1211' similar to the harness application 1211 and enabled to control the display device 290 to generate a representation 1295', which is in turn configured to represent views of associated applications 1210 controlled and coordinated by the harness application 1211').

In general, the harness application 1211 (which alternatively may be referred to as a harness or a wrapper) can be used to connect context data stored in the context object 280 to multiple applications 1210, and ultimately to the user 110, in a transparent manner, which enables to application 1210 to be tuned to the needs of a specific user, or a group of users, within a collaboration. Hence, the default choices or behaviour of applications 1210 can be tuned to the context of a user 110 and hence address likely current needs of the user 110.

Figure 15:
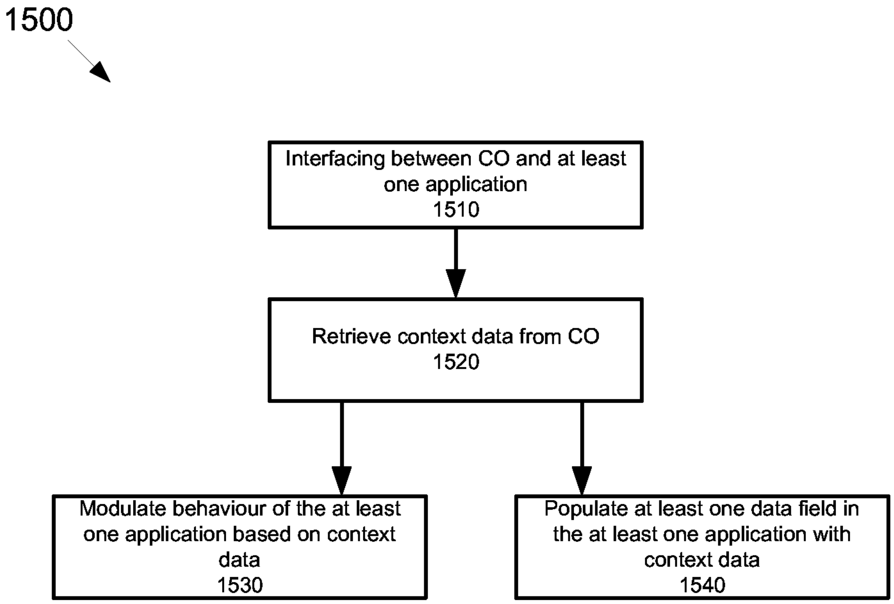
FIG. 15 depicts a method for controlling an application at an electronic device, according to a non-limiting embodiment.

Attention is now directed to FIG. 15, which depicts a method 1500 for controlling at least one application on an electronic device, according to a non-limiting embodiment. In order to assist in the explanation of the method 1500, it will be assumed that the method 1500 is performed using the system 1200. Furthermore, the following discussion of the method 1500 will lead to a further understanding of the system 1200 and its various components. However, it is to be understood that the system 1200 and/or the method 1500 can be varied, and need not work exactly as discussed herein in conjunction with each other, and that such variations are within the scope of present embodiments. For example, while the method 1500 is described with reference to implementation in the harness application 1211, in other embodiments, the method 1500 may be implemented in any application for controlling applications at an electronic device. In particular, the method 1500 may be implemented within any suitable application including but not limited to, scheduling application, e-mail application, browser application, overall application (such as the overall application 1350) and/or a combination.

At step 1510, the harness application 1211 interfaces between the context object 280 and at least one application 1210. For example, the harnessing application 1211 may establish communication with the context object 280 and the at least one application 1210. In some embodiments, the harnessing application 1211 may further determine a first feature set of the at least one application 1210 to be enabled in the current context and/or a second feature set of the at least one application 1210 to be disabled in the current context and/or data fields that may be populated in the at least one application 1210 based on the current context.

At step 1520, the harnessing application 1211 retrieves context data from the context object 280. The harnessing application 1211 then performs at least one of:

1. At step 1530, modulating the behaviour of the at least one application based on the context data. For example, the first feature set may be enabled, and or the second feature set may be disabled. In some embodiments, certain features may be presented to the user 110 within the representation 295, while other features may be blocked.

2. At step 1540, populating at least one data field in the at least one application with the context data. For example, the harnessing application 1211 may fill in user lists, identifiers, e-mail addresses, civic addresses (e.g. business vs. personal), scheduling data, browser results etc., all according to the current context. In some embodiments, the harness application 1211 may also be enabled to populate the at least one application with pre-programmed phrases that are suited to the context. In some embodiments, the pre-programmed phrases can be stored in the CO 280. In other embodiments, the pre-programmed phrases may be incorporated into the harness application 1211 and/or stored at the client device 1230 (e.g. in the memory 1240 for retrieval by the harness application 1211, as required). For example, an instant message generated in the context of a meeting invitation may be populated with phrases such as "Will you please attend" etc. Context data from the CO 280 may be interspersed with such pre-programmed phrases, as required, within an application. Further, pre-programmed phrases may be populated with other context data, based on the current contact. For example, a pre-programmed phrase may comprise: "I am on a call with [John Doe] and we would like to conference you in for a discussion on [Agile Development] topic". In this pre-programmed phrase, "John Doe" is the name detected from calling line ID, and "Agile Development" is a keyword detected on the conversation between users (e.g. users 110 and 110').

EXAMPLES

The functionality of present embodiments is now described by way of non-limiting examples. In order to assist in the explanation of these examples, it will be assumed that these examples are performed via the method 1500 and/or the system 1200. Furthermore, the following discussion of these examples will lead to a further understanding of the method 1500, the system 1200 and its various components. However, it is to be understood that these example, the system 1200 and/or the method 1500 can be varied, and need not work exactly as discussed herein, and that such variations are within the scope of present embodiments. Furthermore, in the following examples, the overall application 1350 comprises the application for managing context, the GUI for which is depicted in FIGS. 6-11. Hence, reference will be made to FIGS. 6-11 as embodiments of a GUI of the overall application 1350: in other words the representation 1295 comprises the GUI depicted in FIGS. 6-11.

Example 1

Scheduling Application

Attention is again directed to FIG. 8, which depicts a calendar tab of the, according to a non-limiting embodiment, which displays calendar information of users/participants associated with the context entered on the ID tab (FIG. 6). For example, the overall application 1350 may process the retrieved context data from the CO 280 to determine participants and/or participant identifiers, and retrieve calendar information associated with each participant for display on the calendar tab. The calendar tab is hence a representation of a scheduling application for scheduling meetings, as controlled by the harnessing application 1211.

Meetings that concern a given context will generally be among the collaborating parties associated with the given context. During these meetings, the collaborating parties may wish to schedule the time for the next meeting. Diary and scheduling software such as Lotus Notes (from 1 New Orchard Rd., Armonk, N.Y., 10504-1783, USA) from has long been used for this purpose. However such meeting schedulers are generally tuned to the general needs of the enterprise within which it is deployed. To operate a scheduler, a user 110 must enter the names of all anticipated participants. This is an inconvenience that makes the use of such tools unattractive for busy users as the users must search for and enter all of the desired names. However, the CO 280 generally comprise the names (and/or identifiers) of all users within the given context and, as well, within the current conference in which the user 110 is participating. Hence, the harnessing application 1211 retrieves this information, and populates the appropriate data fields of the scheduling with the schedules of all users 110 and 110' in the current conference or in the broader context: in some embodiments, the context object 280 comprises the scheduling data (i.e. the schedules of the users 110 and 110' etc.) while in other embodiments, the names (and/or identifiers) of the users 110 and 110' are used to retrieve the scheduling data from a scheduling database. The scheduling application may be configured such that the user 110 is be able to quickly isolate the anticipated participants in the next meeting by clicking on check boxes (note depicted) besides their names or using some other selection mechanism.

Another task that is sometimes desired in the scheduling of a meeting is the creation of an invitation, titles of the meeting etc. Hence, attention is now directed to FIG. 16 which depicts another non-limiting embodiment of the calendar tab GUI of FIG. 8. In these embodiments, the calendar tab GUI comprises appropriate task buttons to create the invitations for a potential meeting, and the GUI of FIG. 16 depicts various fields that may be filled in by the user 110 to create the specific details of the invitation. Each of these fields is enabled to provide the user 110 with one or more canned options that are tailored to the current context. For example, a title field 1605, is accompanied by a MORE button 1607 enabled to cause the overall application 1350 to provide various options when activated (for example by clicking on it with a pointing device), such as "Follow On to <title of current meeting>" etc. That is the canned options will contain fields written in mark up language to indicate relevant data that should be taken from the semi-structured data contained in the CO 280. Similarly an invitation field 1609 may be enabled by a set of canned messages that are appropriate to various situations. These canned invitation messages may also contain mark up indicating relevant CO context data.

The GUI of FIG. 16 further comprises an OTHER MESSAGE button 1615. Clicking on the OTHER MESSAGE button 1615 will cause another window to appear (not depicted) that will contain a selection of messages, appropriate to different contexts and/or circumstances. The user 110 may indicate the appropriate one in any suitable manner (e.g. by clicking on the desired option via a pointing device), and this will be placed in the invitation field 1609. The user 110 may further edit the selected message within the invitation field 1609, or replace it entirely with one of his/her own devising. The canned invitations can contain variable fields in which information stored in the fields in the CO 280 may be filled in. For example, the title of the current meeting may be stored in a field within the CO 280 there and this may be indicated by mark up language (such as <current_meeting>) to be selected at run time.

Invitees to the meeting may also be selected dynamically. It can be assumed that the invitees to a meeting created within a context will likely either be the collaborating parties of the context in general or the members who are involved in the current conference. Hence, in some embodiment, the GUI of FIG. 16 further comprises buttons for automatically bring up these memberships, when activated. For example, clicking of a conference button 1610 will bring up the conference membership and the context button 1620 will bring up the entire context membership. The GUI of FIG. 16 shows that a current conference of four members (including Jack Duckworth, the current scheduler as indicated by his name's presence at the top of the list) has been selected. Their current schedules are shown as bars, coded in any suitable manner (e.g. with hatched bars representing busy time and un-hatched bars representing available time, and/or by colour). A slider 1630 can be used to find a suitable meeting time. Clicking of a SEND button 1640 activates the sending of the invitation. The width of the slider 1630 may be an indication of the proposed length of the meeting. This can be set as a user preference and stored within the context object 280.

The resulting invitation can be sent to each user 110' by any suitable means—Email, IM (instant messaging), voice through text to speech etc. The GUI of FIG. 16 may further comprise select boxes 1660 beside each of the participants' names. For example, it may be the case that a member of the conference or context does not wish to attend to the meeting to be scheduled. Deselecting that box will eliminate him/her from the proposed invitation. In FIG. 16, it can be seen that Mike Baldwin has been deselected and will not be invited to the proposed meeting.

In some embodiment, the GUI of FIG. 16 further comprises a DIRECTORY button 1660. Activation of the DIRECTORY button 1660 causes the overall application 1350 to generate a representation of users 110' who are not in the current conference or context such that these users 110' may be invited to the meeting. Clicking on the DIRECTORY button 1660 will bring up a directory of potential participants (private and/or corporate directories). Selecting a name there will bring the name into the list of participants, and optionally add them to the current context.

It is hence understood that the GUI of FIG. 16 enables the user 110 to quickly assemble the information for a meeting invitation and to send it. Most occurrences of meetings within a context will be handled by use of a few movements of and clicks of the user's pointing device (e.g. a mouse). Information from the context object 280 will be used to parameterize the offered options to make them more useful and the coordination of underlying applications and data sources will be hidden from the user by the harness application 1211. This capability will make the scheduling application more convenient for the user 110 by situating it within his context and so will make it more likely to be used.

The harness application 1211 may be further enabled to access other generic services, such as an Email SMTP server, a scheduling database, etc., via their respective generic APIs. In these embodiments, the harness application 1211 may be further enabled to coordinate the activity of these services, for example with input from the user 110. As indicated above, the harness application 1211 is enabled to parameterize the options that it presents to the user 110 via context data retrieved from the CO 280.

Hence, in summary the scheduling application is enabled with default behaviours that are modulated to a given context, and further demonstrates the use of the harness application 1211 to automate access to scheduling, Email and IM systems. The scheduling application is enabled to extract context data from the CO 280 as to likely participants, reasons etc for a meeting, and to use this information to reduce the input from a user in scheduling meetings.

Example 2: Email Application

Email systems in the prior art generally provide a system of folders with which to organize Emails. This enabled users 110 to organize Emails relevant to various contexts in separate folders. However this form of organization requires the active input of a user 110. The user 110 must take the time to move Email from one folder to another. It is a common experience that users 110 can manually create relevant folders with the best of intentions but the time pressures of their jobs prevent them from maintaining these folders adequately. The folders provide little real help because they are not maintained and not easy to maintain.

Further, prior art Email agents are private in nature. They are based on the model of a single user receiving mail addressed to him/her. Collaborative functions are of a different nature. Although certain individual participants in a context may exchange Emails among themselves in furtherance of some goal, these communications are in no way private. Other participants may well expect to be able to review these Emails to create an understanding of why a certain decision was reached, how certain data was gathered etc. This is all part of the natural review process within a collaboration. Furthermore, participants who are new to a context will wish to review its Email history as part of the process of becoming familiar with its current state. Currently, compiling such a history is inconvenient and labour intensive, especially in instances where there are many participants in a context and there many Emails between individual participants This problem may be addressed via the harness application 280 interfacing between the Email application and the CO 280. For example, each user 110 and 110' may be provisioned with an Email application/agent that may, on the surface, resemble conventional Email applications, such as Microsoft Outlook™ (from Microsoft Corporation, One Microsoft Way Redmond, Wash. 98052-7329 USA) and Lotus Notes™ (from IBM, 1 New Orchard Rd. Armonk, N.Y. 10504-1783 USA). In some embodiments, the overall application 1350 may comprise such an e-mail agent. However, while the Email application may comprise a primary Inbox with the standard capability for creating folders to retain Emails relevant to specific topics and/or contexts, in contrast to Email applications in the prior art, the Email application of present embodiments is enabled to automatically create folders for contexts are when the user 110 becomes a participant in the contexts. Further, the Email application of present embodiments is generally aware of the currently active context of the user 110, for example via data stored within the shared memory 270. Thus Emails which are opened during a context (which are assumed to be relevant to the context) are automatically stored within the relevant context folder and/or within the CO 280. Thus a user 110 and//or 110' who wishes to review the Email history of a context will have that history automatically collated for him/her.

A non-limiting representation of a context folder 1700 of this design is depicted in FIG. 17. The context folder 1700 resembles a folder from Email applications in the prior art, in that columns are provided to contain the identity of the originator of an Email (column 1705) of the mail, the date that the Email was sent (column 1707) and the contents of the subject field of the Email (column 1709). In addition a preview field 1720 is depicted to show the contents of a selected Email 1725. Alternatively, the preview pane 1720 may be omitted and Emails may be displayed in a floating text box after their title has been selected by the user 110. A column 1730 is provided to show the primary recipient of the Email. FIG. 18, which is substantially similar to FIG. 17 with like elements having like numbers, depicts an optional technique for revealing all intended recipients of the Email: if a cursor is held above the To field of an Email, a floating text box 1810 may be generated which contains the names of all intended recipients. Other techniques are within the scope of present embodiments including, but not limited to, showing the recipients in the preview field 1720.

In any event, instead of being a repository for Email sent to a particular user 110, the context folder contains all Email exchanged by the collaborating parties associated with a given context, essentially categorized and/or sorted according to context. Hence, the issues being discussed are quickly determinable, as are the interactions leading to their resolve. Inter-relatedness and dependencies among issues are hence also determinable, and as well how this is manifested in the work of the collaborating parties.

This is more fully illustrated in the example in FIG. 17: Annie Walker has sent an Email 1750 to Rita Fairclough concerning a customer preview on Feb. 28, 2008. Though not depicted, the text from the highlighted Email in the preview pane 1720 would that this customer preview is about the active displays for the B3499 project, as well as that Jack Duckworth, a senior manager, has been asked about the issue. Examination of further Emails in the context folder 1700 might reveal that Jack Duckworth is concerned because he is seeing the possibility of large orders and hence the customer preview is important. Rita, to respond to Annie's inquiry, has contacted Stan Ogden and Mike Baldwin of engineering, in the Email 1755 on Feb. 28, 2008, about the B3499 functionality. Stan Ogden and Mike Baldwin, in turn, have discussed the matter between themselves in the Emails 1760 and 1765 on Mar. 1, 2008 and Mar. 3, 2008, respectively. Finally Jack's interest in the projected in Email 1770 on Mar. 3, 2008 has prompted Rita to ask Gail Platt to check on the progress in engineering in Email 1725 on Mar. 4, 2008. Gail has replied with good news in the Email 1775 on Mar. 4, 2008.

Thus, the history of interactions is classified and stored, and an overall view of the state of progress and/or success on the goals of a context is determinable, without restriction to Emails in which an individual user has participated or to individual threads of concern. Rather, the workings of the entire context is determinable as various issues are addressed, which progresses in turn among various issues as they are resolved.

To implement the context folder 1700, the system 1200 may further comprise a central POP3 server 1280 (see FIG. 12), to accept Emails. The client device 1230 and/or the server 1215 is enabled to poll the POP3 server at regular intervals to pull received Emails addressed to the user 110 who is registered to the client device 1230. As described previously, each context in which a user 110 is participating will have a folder automatically created for it in the Email application when the user 110 joins the context. The Email in this folder will be shared with the other members of the context by use of the P2P network described above.

The Email application may be further enabled to allow a user 110 to further indicate that a given Email is part of a context by any of several methods. For example, the user 110 may drag the Email to the folder supplied for the context. Alternatively, if the user 110 opens an Email while he is within a context, then the Email may be automatically be added to the folder for that context. Other techniques that enable to classification of an Email as part of a given context are within the scope of present embodiments.

The P2P network described above may also be used to share Email within a context by the carriage of the full text of each Email, and other pertinent data, and to store the Email in the CO 280. As an Email is classified as part of a context, the Email application may be enabled to update a Local Configuration Server (LCS) and the Email may be distributed to the other members of the context. The Email application supplied to each user 110' will scan the CO 280 for Emails and automatically add the new Email to the context folder.

In some embodiments, the Email may be stored in a format within the CO 280 and/or the context folder 1700 that contains a number of fields. Among these fields may be TO with the receive list of participants as the values FROM: with the sender as the value DATE: with the time of day and date as the value TITLE: with the title of the Email as the value TEXT: with the TEXT field as its value (Optionally) HASH: with a hash of the TEXT field (i.e. the Email text) as its value.

The HASH field may be user as a quick means of detecting duplicate Emails. Since an Email will be sent to multiple members of a context, the LCS will be updated with the new contextual Email by multiple members of the context. It would be undesirable for a context folder to contain multiple versions of the same Email. Thus the LCS on receipt of an update containing a new context Email, will attempt to match its HASH value with the HASH values of existing Emails in the context folder. If there is no match, then the newly received Email is not a duplicate and will be added to the context folder 1700 and distributed to other members of the context. If there is a match, then there is a possibility of a duplicate Email. The LCS will then match the other fields of the newly received EMAIL with those stored Emails whose HASH matches it. If a match is found in all fields, then a duplicate will have been detected and the LCS will take no further action with the Email. If no complete match is found then the newly received Email will be added to the context folder 1700 and distributed to the other members of the context.

While FIG. 17 presents a view of all Email within a given context, there may be other useful ways of viewing Email in the given context. For example in the GUI of FIG. 7 all Email from a specific user 110' is displayed. This may be useful in the case in which a user 110 is participating in a telephone call from the specific user 110'. As the CO 280 contains all Emails within a specific context, the display of FIG. 7 may be generated on demand. Indeed, in some embodiments, it may automatically be brought up during a telephone call in preference to view of FIG. 17. Many other types of views could be provided such as views restricted to specified threads etc. The Email applications distributed to each user 110 and 110' can be configured to extract and display the required Emails from the CO 280. Examples of types of views include, but are not limited to, all unread Email, all read Email, and all Email within certain date ranges. This would enable a user 110 in a telephone call to quickly respond to a question by the caller, for example as to if the user 110 has read an Email proposal sent out in the last few days.

To address security concerns (e.g. concern that the context-wide views of Email will distribute potentially sensitive material too widely), various restrictions on how the views can be generated may be imposed. For example, one restriction could be that only senior managers would be able to see context-wide views on Email while all users would be able to see other views such as all Email from a calling party. These restrictions could be placed in and enforced by the Email applications provided to each user 110 and 110'. Thus the Email applications may enforce enterprise policies, and other criteria, that would be implemented in such restrictions.

Hence, in summary, the Email application functions for groups and not just individuals by sharing of contextual interactions by creating and retaining an Email folder for all contexts within which a user 110 is participating. All Emails, that are determined to be part of a context, will be shared among all participants in the context that are determined to be part of a context (but which may be subject to polices on privacy and security).

Example 3: Browser Application

In general browser, application in the prior art have numerous deficiencies in supporting collaborative work. Among these are:

a) Their rankings and relevance results are not tuned to the needs of collaborations. Rather, their searching mechanisms are based on the needs of the general web user rather than a particular collaboration within an enterprise.

b) They are aimed for use by a single user because of the nature of the standard web browser. There is no capability for the sharing of results by more than one user at a time.

c) They have no history. They will provide the same results for collaboration each time a search is made. Additionally, they do not provide a means for retaining past useful searches and results and making these available to participants in a collaboration, or to new members in a collaboration who want to be brought up to speed. Previous systems have no capacity to adjust themselves to the needs of a collaboration.

d) They are passive in that they respond only to active search requests. Collaboration within a given context is often interactive with two or more people interacting in a voice or video conference. Consulting a PC to make a search request can be distracting and hinder the necessary interchange of ideas.

e) This passivity also makes them dependant on user requests, such that search engines cannot actively interject the results of new searches that have been suggested by the direction of the current human interchange.

Hence present embodiments within this example provide various forms of collaborative browsing that will assist the users 110 and 110' in cooperating and maintaining a common sense of awareness during the collaboration in a given context, including sharing of searches among a collaboration context and specific (multimedia) media conferences. Latter embodiments provide for proactive searching with keywords extracted from the media conferences and/or supporting text documents. Some of these embodiments include methods for assembling keywords for searches to produce more focussed and relevant searches, as described below.

FIG. 19 depicts a block diagram of the software architecture of the system 1200, in embodiments where one of the applications 1210 at the server 1215 comprises a browser application 1810, according to a non-limiting embodiment. FIG. 19 is substantially similar to FIG. 13 with like elements having like numbers. In other embodiments, however, the overall application 1350 comprises the browser application 1810, while in further embodiments the browser application 1810 may comprise the functionality of the harness application 1211.

In any event, in these embodiments, the representation 1295 comprises a GUI similar to the GUI depicted in FIG. 10, which is displayed to a user 110 whose client device 1230 is processing the overall application 1350. In general, then, in these embodiments, the representation 1295 acts as the front end/browser interface for the browser application 1810. to assist the user 110 when he/she is involved in collaborative activities within different contexts. Hence, the representation 1295, within the architecture of FIG. 19 allows the user 110 to participate in collaborative proactive browsing, within different contexts. With proactive browsing, present embodiments may also be enabled to monitor a voice conference for key words and display them along with web searches performed on the key words.

The browser application 1810 is generally enabled to interface with search engines in the internet, such as search engines 1821 and 1822 (e.g. Google). However, the harness application 1211 modulates the browser application 1810 to: a) place queries to multiple search engines in response to search terms entered by the user in the representation 1295; b) restrict these queries to search engines and areas of the web and databases that are useful for the types of search indicated by the user 110 in the current context; c) eliminate duplicate responses and to prioritize the results for presentation; and d) present these results to the user 110 within the representation 1295.

In some embodiments, the user 110 may select the type of search required using an indicator similar the slider 1010 depicted in FIG. 10. Hence, the user 110 may indicate that he/she wishes responses that are tailored to a certain context. For example he/she may want to find sites that detail the technical aspects of a certain technology (Technical) or may wish to find the market share of various suppliers of that technology (Industry), as indicated by the slider position As described above, users 110 and 110' may act in multiple collaborative contexts, with context data stored in the CO 280. Hence, in these embodiments, the CO 280 generally comprises contain the parameters that customize the behaviour of the browser application 1810, for each individual context. For example, the CO 280 may contain the search parameters that indicate the databases, search engines and areas of the web for each of the categories of search. Hence, via the harness application 1211, search terms are used to obtain results from multiple search engines 1821, 1822, etc., though the number of search engines not particularly limiting. Parameters retrieved from the context object 280 by the harness application 1211 may be used to select which databases and which search engines will be queried.

Additionally, the browser application 1810, as modulated by the harness application 1211, can use parameters from the context object 280 to restrict the areas of the web that will be searched. Thus, the browser application 1810 will initiate searches based on parameters that are suited to each context and each category from the context object 280. Further searches can also be restricted by supplying additional restrictive keywords for the set of keywords that will be used in the search. For example, the term "baseball" could be supplied as a restrictive keyword that would direct a search on the terms Washington and Senators to the historic baseball team rather than the house of congress. Restrictive parameters can also be combined so that for example, restrictive keywords can be paired with the site restriction illustrated above.

As further depicted in FIG. 19, in some embodiments, gatekeepers, such as other users 110', can select and enter the types of search parameters described above into the context object 280 for each context. As an example, the originator of a context could act as a gatekeeper and enter the first set of search parameters on the creation of a context. A base set of parameters could be set up by default in the context object 280 and this could be modified and supplemented by the originator. Further participants in the context and additional gatekeepers could also be given the capability of modifying these search parameters as well.

It will be recalled that in some embodiments, distributed copies of context objects 280 may be updated via a P2P network, and that the structure of this P2P network, comprises an elected master node enabled to receive updates, which in turn distributes the updates to participating nodes (i.e. computing/communication devices and/or servers). A node is generally understood to be a computing device comprising a memory, a communications interface and processor. Each participating node will have a publication/subscribe relationship with the master node. As depicted in FIG. 20, described hereafter, such a P2P network 2010 may be used to implement embodiments for collaborative browsing. In other embodiments, other communication networks (e.g. communications network 250) be used.

One of the primary benefits of collaborative applications is the capability of mutual awareness. That is, a user 110 is not working in isolation but can benefit from the collective effort of the others in the collaboration. In a face to face environment, this can come from the informal interactions that take place in which collaboration members can share results with each other casually. Hence, in FIG. 20, it is understood that the P2P network 2010 is accessible by the members of collaboration, and that the search terms and results provided for all queries will be returned to the master node in the P2P network by all members. The master node will in turn broadcast these to all user nodes. An overall application 1350'*a*, 1350'*b*, etc., as described above (and/or a browser application), which includes a GUI similar to that of FIG. 10, can be provided to each user 110' that will display all search terms and results.

In this way, every user 110' will be aware of the searches that are being performed by all other members of the collaboration. This will provide the collective awareness that is a benefit of collaboration. For example, members seeing a novel search term may become aware of a new slant of their work. As another example, members seeing another member's searches can take the initiative to share their knowledge of the subject with him/her. Collective/collaborative effort is thus enhanced.

Attention is now directed to FIG. 21, which is substantially similar to FIG. 20, with like elements having like numbers. In general, FIG. 21 illustrates collaborating parties, who are members of a context, engaging in a conference. Specifically, a voice conference call has been set up among a subset of the members of the context, users 110 and 110'*b*, via communication devices 2110*a* and 2110*b*, respectively. It is understood that the communication devices 2110*a* and 2110*b* are in communication via a suitable communication network and are enabled to convey voice data there between. In other words, the users 110 and 110'*b* may be talking on the phone.

It may be desirable during such voice conferences for individual members to perform searches on various topics that come up. It was described above how the sharing of search results could enable the collective awareness of all members of a context. Similarly, the sharing of search results among all members participating in a particular conference may be desirable: it would enable members to appreciate the understandings that others members are generating about various issues. It will allow for an indirect sharing of results that will allow a tacit understanding of topics that other members fined interesting. This is similar to people watching the reactions of others during a face to face conference. Obscure, contentious etc. issues can be identified from these reactions and the course of the conference changed to address them. Hence, one user (e.g. user 110) enters a search term into the overall application 1350, and both users 110 and 110' are presented with the results of the search via their respective overall applications 1350 and 1350'*b*.

In some situations, shared browsing within a conference may suffer from the deficiency in that it relies on individual users entering search terms of interest. Hence, in some embodiments, the overall application 1350 may be enabled to detect topics of interest and autonomously provide searches and results to the users. The results of these searches could suggest implications of their discussions to users that they had not considered. In addition to enabling the collective awareness, this proactive capability would encourage the exploration of new avenues of discussion by providing search results suggested by the user discussion. This is similar to the function of human gatekeepers, described above, of listening to a discussion and suggesting new possibilities and avenues of exploration.

An understanding of how a particular non-limiting embodiment for proactive searching may be implemented may be gained with reference to FIGS. 20 and 21. For example, the context object 280 for each context could contain a set of keywords for each context, that (e.g.) external gatekeeper(s) (or some automatic mechanism) have decided could be relevant to the discussion. In the voice conference illustrated above, the overall application 1350 may further comprise an automatic speech recognizer (ASR) 2150 enabled to recognize the occurrence of the keywords in the conference, for example via the harness application 1211. Once a key word is detected by the ASR 2150, the detected keyword is supplied to the browser application 1211 (e.g. of the master node) which would initiate searches on them. When the results are returned to the master node, the results are subsequently broadcast the result to all other nodes (or alternatively a subset of nodes, for example only nodes associated with users participating in the conference) via the P2P network 2010. The results will then be displayed in the representation 1295' (e.g. see FIG. 14) associated with individual users 110', such that the users 110' may view the results of the search. Users 110 and 110' may also enter their own keywords and receive the results from them as well.

One potential difficulty with the keyword description system described above would be that common keywords would generate repetitive searches. This would work against the purposes of the system since users would tend to ignore repetitive results as being not useful. This problem may be addressed, however, providing a time out on the use of individual keywords. Within the context object 280, a parameter can be set that indicates the time of day at which the keyword was last used, and in some embodiments, the time within a specific conference. On detection of a keyword, this parameter would be checked and if sufficient time has not elapsed then no search would be performed. The time of day parameter would be updated on each occurrence of the keyword. Other methods of avoiding repetitive searches are within the scope of present embodiments.

While proactive browsing was described above with the reference to voice conference and speech recognition, proactive browsing may be implemented within other types of conferences in other types of media. For example keywords can be extracted from the text of instant messages. Similarly keywords could be extracted from Emails and other text documents (requirements documents, etc.) that a user accesses during a conference. Searches can be performed on these keywords and reported to all users. The extracted key words can be sent to the master P2P node which will perform the searches and perform a common keyword check. In a multimedia conference, keywords can be extracted from some or all media and used for searches in the manner described above.

Furthermore, while proactive browsing has been described with reference to collaborations between users, proactive browsing is generally useful for individual users as well. For example, a user conversing on the telephone could have searches performed from keywords detected in the conversation. This would assist him/her in his/her interactions with the other party. The user would be supplied with results within a GUI similar to that described above. However, in these embodiments, search results are not shared and hence no P2P network would be supplied: searches would be performed from the users own client device While pro-active browsing has been described above in terms of the detecting and searching on individual keywords, in some instances individual keywords may not bring up the most pertinent searches within a conference. However, multiple keywords may produce more focused searches since pages that contain all or most of these keywords may be more relevant to the topic under discussion. Such multiple key word searches are within the scope of present embodiments and they may be implemented by accumulating keywords until a prescribed number is obtained. Thus, for example, searches may be performed on the last four keywords detected.

In another possible method, all keywords in a conference may be accumulated as the conference proceeds and searches performed on random selections of these keywords. This would allow proactive searching to be performed using evidence from across a conversation. This would enhance the focus of the searching and improve its pertinence.

Other techniques for using multiple keywords can use combinations of the techniques described above such as combining the last or last few key words detected with a random selection of keywords (or a signal random keyword) previously detected from the conference.

To this point, within Example 3, the use of the collaborative browsing during times when the user is actively participating in a context has been described. However there may be instances in which a user will wish an overview of a context. This could be a new user who is just entering a context and wishes to have a high level view of the work performed to date within the context. Another instance may be an existing user who has not participated actively for a while and wishes to be brought back into the awareness of what is going on. In conventional face to face systems, this can be brought about by consulting with some of the gatekeepers who are familiar with the subject matter of the context. These gatekeepers can make a variety of recommendations but a common recommendation is to consult various references. Currently many of these references are on the web or in specialized databases. However, present embodiments may be enables to provide his function. For example, the overall application 1350 may be enabled to supply set of keywords retrieved from the CO 280 by the harness application 1211, and the resulting search results which will comprise a summary of a context of previous conferences.

In the proactive searching that has been described heretofore searches occur on keywords that have been brought up in a conference that is part of a context. It is keyed to search for the use of novel keywords so as to eliminate repetitive searches that would bring nothing new to the conference. To do so, it discovers commonly used keywords and suppresses searches on them. The properties of the set of keywords that define a context are similar in some respects. To be useful, it is desirable that these keywords not be common keywords that may be used across multiple contexts. Additionally, it is desirable that these keywords not be too novel since infrequently used words will tend to have limited pertinence to a context. Rather, it is desirable that these keywords be words that are used consistently by the members of a context in their conferences.

Hence, the most desirable keywords are words that are common in a context but not too common. Common keywords will be used across multiple contexts and so not be of specific relevance to a single context, and uncommon keywords will be of only marginal relevance. These "common but not too common" keywords may be referred to as "apposite keywords" in that they are the most appropriate keywords to characterize a context.

As described above, in some embodiments, proactive searching may include the technique of discovering common keywords by use of a time of day parameter in the context object 280. Common keywords will generally be associated with a recent time of day value in this parameter and so will be suppressed from keyword searches. To discover apposite keywords, a similar technique may be used. For example, another parameter may be maintained in the context object 280 for a conference that stores the number of times that a keyword is used in the conference. When a conference is terminated, these values are reported to the master P2P node for the context across the context P2P network. The master P2P node will maintain a use count parameter for each keyword. The reported keyword counts will be summed with the existing count and used as an indication of the commonness of the word. This count may be called the context commonness count (CCC).

The CCC is maintained in multiple ways. Firstly, a maximum value may supplied which no count can go above. If any sum exceeds this amount, the maximum amount is entered in the CCC. Secondly an aging function may be supplied. Periodically, each count will be decreased by a set amount. Counts may also not go below zero. Thus words as they are used cause the count to increase. However, if they cease to be used their CCC count will fall towards zero. Commonly used keywords will thus have high values while less used words will have low or zero counts. Thus a context will have a record of its commonly used keywords.

To discover apposite keywords, a context (in the form of the master P2P node) will compare its own common keywords with the common keywords discovered by other contexts in which the user is involved. Apposite keywords are those keywords which are common in the home context but relatively uncommon in others.

To produce a set of context references, the master P2P node for a context will perform searches on its discovered apposite keywords. As with other searches described herein, this will result in a prioritized set of web pages that will constitute a background summary of the context.

To improve the capability of this search, searches can be done with multiple apposite keywords. Detected common keywords can also be included in these keywords sets. Web pages that contain multiple apposite and common keywords can be considered to be highly appropriate as summaries of a context. This technique may be desired in instances where few or no apposite keywords are found. For such generic contexts, summaries may be produced with sets of common keywords Within a collaborative environment, there may still be instances where a user is acting alone, for private preparation of documents, research etc. In these instances, the user 110 would enter a set (one or more) search terms into the overall application 1350. The types of search would already have been selected. The overall application 1350 would take these search terms and the search parameters for current context and initiate multiple searches among the various selected databases and search engines along with the restrictions on the areas of the web to be searched. It would take the multiple search results, prioritize them and supply them to the user 110 via the representation 1295. As described above, these search results may be shared with the collaborating parties in a context to enable mutual awareness of the search results.

In some embodiments, security and/or privacy policies may be applied to search results. For example, in some instances, sharing of the search terms and results can be undesirable. There may considerations of personal privacy and as well there may be cases in which the sharing of preliminary ideas will work against the interests of the context.

As an example, a user may be multitasking by monitoring a conference in a given context and at the same time dealing with another issue in another context, and/or interacting with another person who is physically present but who is not part of the given context. Hence, the user may wish to create a search for some matters external to the conference and/or the given context. Sharing of these searches could violate the privacy of the user or the other person(s) present, and as well could cause confusion in the conference as other conferees try to understand the relevance of the unrelated search. In another example, an idea may occur to a user during the conference and he/she may wish to perform some quick research to flesh it out before bring it up for conference consideration. Thus a quick search performed on the preliminary idea would be undesirable to share with other conferees since the results may represent an idea that the user is not ready to present within the conference and/or the context.

The above privacy considerations may also be extended to the consideration of supporting text documents (Emails, requirements documents etc.). As described earlier, keywords may be taken from Emails and other supporting documents that a user may be considering during a conference. As before, consideration of these supporting documents may be part of a user's multitasking and not directly belong to a conference. Hence, controls can be provided within the representation 1295 (e.g. in the GUI of FIG. 10) that would indicate that one or more certain kinds of documents be excluded from this keyword extraction.

Further controls may be added to indicate that some or all searches initiated by a user, or with keywords taken from all or certain types of supporting documents, should be kept private. A control button could be added to the representation 1295 (e.g. in the GUI of FIG. 10) to indicate that the present or all searches should be private. The context object 280 could contain a similar control indication that would indicate that all user-initiated searches should remain private.

Attention is again directed to FIGS. 6 to 11. It is noted that as context information is presented to a user, the user is relieved from having to enter text, but rather is enabled to complete processes by moving and/or clicking a pointer (e.g. input device 234). For example, in some situations, such as when a user is interacting with a mobile device (i.e. the client device 1230 comprises a mobile electronic device), entering text may be inconvenient, and further places undo stress on a keyboard. Hence, by populating the various applications (browser, messaging, calendar etc.) with contextual data, the user's typing activities are reduced and/or eliminated.

Those skilled in the art will appreciate that in some embodiments, the functionality of the context manager 210, tuple space 410, the system management agent 420, the relationship assigning agent 430, the context agents 440, the rule assigning agent 450, the conflict resolving agent 460, the harness applications 1211 and 1211', and the overall applications 1350 and 1350' may be implemented using pre-programmed hardware or firmware elements (e.g., application specific integrated circuits (ASICs), electrically erasable programmable read-only memories (EEPROMs), etc.), or other related components. In other embodiments, the functionality of the context manager 210, tuple space 410, the system management agent 420, the relationship assigning agent 430, the context agents 440, the rule assigning agent 450, the conflict resolving agent 460, the harness applications 1211 and 1211', and the overall applications 1350 and 1350' may be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive), or the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for controlling at least one application on an electronic device using an application on a client device for controlling applications comprising the at least one application, the method comprising:

establishing a collaborative session over a communication network using the client device;

determining a context of the collaborative session by receiving a session initiation protocol (SIP) Invite, a calling line identification, an automatic number identification, other signaling construct, a peer-to-peer system, or wherein the context is based on a last context used with a caller, a first context to which a user turned during a last communication with the caller, or a cumulative time used for a given context;

using the application on a client device for controlling applications, interfacing between a context object stored in a shared memory of a system and the at least one application;

using the application on a client device for controlling applications, retrieving context data from said context object using the application on a client device for controlling applications;

using the application on a client device for controlling applications to perform at least one of:

updating said context object with new context data derived from interactions with the at least one application;

modulating behaviour of the at least one application based on said context data; and populating at least one data field in the at least one application with said context data; and sharing the context data with another application.

2. The method of claim 1, wherein the method comprises modulating behaviour of the at least one application based on said context data, and wherein said modulating the behaviour of said at least one application based on said context data comprises at least one of enabling a first set of features in the at least one application and disabling a second set of features in the at least one application.

3. The method of claim 1, wherein said context object comprises an active context object.

4. The method of claim 1, further comprising determining an active context and wherein said retrieving said context data from said context object is based on said active context.

5. The method of claim 1, wherein said context object is shared between collaborating parties associated with said context.

6. The method of claim 1, wherein the at least one application comprises an e-mail application.

7. The method of claim 6, wherein said context data comprises e-mail data associated with a context, and said modulating said behaviour comprises displaying all said e-mail data.

8. The method of claim 1, wherein the at least one application comprises a scheduling application.

9. The method of claim 8, wherein said context data comprises scheduling data of collaborating parties associated with a context, and modulating said behaviour comprises processing said schedule data.

10. The method of claim 9, wherein said modulating said behaviour further comprises offering options in a user interface based on said context.

11. The method of claim 9, further comprising determining a subset of collaborating parties that are participating in a conference via at least one communication device, and wherein said processing said schedule data comprising processing schedule data associated with said subset.

12. The method of claim 1, wherein said context data comprises identifiers of users associated with a context and said populating said at least one data field comprises populating said at least one data field with said identifiers.

13. The method of claim 1, wherein the at least one application comprises a browser application.

14. The method of claim 1, wherein said context data comprises keywords, said keywords comprising at least one of common keywords and apposite keywords and said modulating said behaviour comprises searching on at least one of said keywords.

15. The method of claim 1, wherein said populating said at least one data field comprises populating said at least one data field in a plurality of browser applications, each associated with collaborating parties associated with a context, in a one-to-one relationship.

16. The method of claim 1, wherein said interactions with the at least one application comprises automatic speech recognition for identifying said keywords and wherein said searching on at least one of said keywords is initiated in response to said automatic speech recognition identifying said at least one of said keywords.

17. The method of claim 1, wherein said interfacing between a context object and the at least one application occurs via a harness application at a second electronic device, said harness application in communication with said context object and the at least one application via a communication network.

18. The method of claim 1, wherein said context data comprises pre-programmed phrases.

19. An electronic device for controlling at least one application, the electronic device comprising:

an application for controlling applications;

a context manager associated with a user to provide a current context via a representation;

a communication interface for interfacing between a context object stored in a shared memory of a system and the at least one application via a communications network; and a processing unit enabled for:

processing a context manager application;

retrieving context data from said context object; and at least one of:

updating said context object with new context data derived from interactions with the at least one application;

modulating behaviour of the at least one application based on said context data; and populating at least one data field in the application with said context data wherein the electronic device determines the current context of the collaborative session by receiving a session initiation protocol (SIP) Invite, a calling line identification, an automatic number identification, other signaling construct, a peer-to-peer system, or wherein the current context is based on a last context used with a caller, a first context to which a user turned during a last communication with the caller, or a cumulative time used for a given context, and wherein the application shares the current context date with another application.

20. A method for controlling at least one application on an electronic device comprising:

establishing a collaborative session over a communication network using a client device;

determining a context of the collaborative session by receiving a session initiation protocol (SIP) Invite, a calling line identification, an automatic number identification, other signaling construct, a peer-to-peer system, or wherein the context is based on a last context used with a caller, a first context to which a user turned during a last communication with the caller, or a cumulative time used for a given context;

interfacing between an active context object and the at least one application via a harness application on the client device, said active context object associated with an active context;

using the harness application, retrieving context data from said active context object;

at least one of:

updating said active context object with new context data derived from interactions with the at least one application, said interactions associated with said active context;

enabling a first set of features in the at least one application;

disabling a second set of features in the at least one application;

populating at least one data field in the application with said context data; and sharing the context data with another application.

* * * * *